United States Patent
Saito et al.

(10) Patent No.: US 8,754,930 B2
(45) Date of Patent: Jun. 17, 2014

(54) VIDEO TRANSMISSION DEVICE, VIDEO DISPLAY DEVICE, VIDEO DISPLAY SYSTEM, VIDEO TRANSMISSION METHOD AND COMPUTER PROGRAM

(75) Inventors: Takehiko Saito, Kanagawa (JP); Koichi Takenaka, Tokyo (JP)

(73) Assignees: Sony Corporation (JP); Sony Computer Entertainment Inc. (JP)

(*) Notice: Subject to any disclaimer, the term of this patent is extended or adjusted under 35 U.S.C. 154(b) by 99 days.

(21) Appl. No.: 13/255,128

(22) PCT Filed: Jan. 7, 2011

(86) PCT No.: PCT/JP2011/050161
§ 371 (c)(1),
(2), (4) Date: Sep. 7, 2011

(87) PCT Pub. No.: WO2011/086977
PCT Pub. Date: Jul. 21, 2011

(65) Prior Publication Data
US 2011/0316990 A1    Dec. 29, 2011

(30) Foreign Application Priority Data

Jan. 14, 2010  (JP) ................ P2010-005722

(51) Int. Cl.
*H04N 13/04* (2006.01)
*H04N 13/00* (2006.01)

(52) U.S. Cl.
USPC ............................................ 348/51; 348/42

(58) Field of Classification Search
USPC .............. 348/51, 42, E13.075, E13.001, 348/E13.002; 386/68, 94, E05.003
See application file for complete search history.

(56) References Cited

U.S. PATENT DOCUMENTS

2009/0103833 A1    4/2009  Mitsuhashi et al.

2010/0150523 A1*  6/2010  Okubo et al. .................. 386/68
(Continued)

FOREIGN PATENT DOCUMENTS

| CN | 1497923 A | 5/2004 |
|---|---|---|
| CN | 1791189 A | 6/2006 |

(Continued)

OTHER PUBLICATIONS

Office Action from Chinese Application No. 2011-80002276.8, dated Dec. 3, 2013.

(Continued)

*Primary Examiner* — Dave Czekaj
*Assistant Examiner* — Dramos I Kalapodas
(74) *Attorney, Agent, or Firm* — Lerner, David, Littenberg, Krumholz & Mentlik, LLP

(57) ABSTRACT

Provided is a video transmission device that includes: a transmission signal output portion that outputs a video signal that causes two-dimensional video or three-dimensional video to be displayed, an audio signal that causes audio to be output, and a control signal including information relating to the video signal and the audio signal; and a control portion that controls content of the control signal output from the transmission signal output portion. When the video signal switches from three-dimensional video to two-dimensional video, the control portion does not stop output of the video signal from the transmission signal output portion, and controls the transmission signal output portion such that information indicating that the video signal output from the transmission signal output portion has switched to two-dimensional video is included in information indicating that the video signal is three-dimensional video that is output from the transmission signal output portion.

15 Claims, 19 Drawing Sheets

(56) References Cited

U.S. PATENT DOCUMENTS

2011/0096146 A1* 4/2011 Hulyalkar et al. .............. 348/43
2011/0261157 A1* 10/2011 Kiyama .......................... 348/43

FOREIGN PATENT DOCUMENTS

| | | |
|---|---|---|
| CN | 1799267 A | 7/2006 |
| CN | 1882080 A | 12/2006 |
| CN | 1893653 A | 1/2007 |
| EP | 1501316 A1 | 1/2005 |
| EP | 1633148 A1 | 3/2006 |
| EP | 1739979 A2 | 1/2007 |
| JP | 09-138384 A | 5/1997 |
| JP | 2000-036969 A | 2/2000 |
| JP | 2003-045343 A | 2/2003 |
| JP | 2005-006114 A | 1/2005 |
| JP | 2005110121 A | 4/2005 |
| JP | 2008-005203 A | 1/2008 |
| WO | 2009077929 A1 | 6/2009 |

OTHER PUBLICATIONS

Extended European Search Report for Application No. EP11732847 dated Jan. 7, 2014.

* cited by examiner

FIG. 10

| Byte \ Bit # | 7 | 6 | 5 | 4 | 3 | 2 | 1 | 0 |
|---|---|---|---|---|---|---|---|---|
| HB0 | 0 | 0 | 0 | 0 | 0 | 0 | 1 | 1 |
| HB1 | 0 | 0 | 0 | 0 | 0 | 0 | 0 | 0 |
| HB2 | 0 | 0 | 0 | 0 | 0 | 0 | 0 | 0 |

| Byte \ Bit # | 7 | 6 | 5 | 4 | 3 | 2 | 1 | 0 |
|---|---|---|---|---|---|---|---|---|
| HB0 | 0 | 0 | 0 | Clear_AVMUTE | 0 | 0 | 0 | Set_AVMUTE |
| HB1 | PP3 | PP2 | PP1 | PP0 | CD3 | CD2 | CD1 | CD0 |
| HB2 | 0 | 0 | 0 | 0 | 0 | 0 | 0 | Default_Phase |
| HB3 | 0 | 0 | 0 | 0 | 0 | 0 | 0 | 0 |
| HB4 | 0 | 0 | 0 | 0 | 0 | 0 | 0 | 0 |
| HB5 | 0 | 0 | 0 | 0 | 0 | 0 | 0 | 0 |
| HB6 | 0 | 0 | 0 | 0 | 0 | 0 | 0 | 0 |

- Set_AVMUTE    [1 bit] Set the AVMUTE flag.
- Clear_AVMUTE  [1 bit] Clear the AVMUTE flag.

FIG. 15

InfoFrame THAT TRANSMITS 3D INFORMATION (EXAMPLE)

Packet Header

| Packet Byte# | 7 | 6 | 5 | 4 | 3 | 2 | 1 | 0 |
|---|---|---|---|---|---|---|---|---|
| HB0 | Packet Type | | | | | | | |
| HB1 | Version | | | | | | | |
| HB2 | 0 | 0 | 0 | Length = Nv | | | | |

Packet Content

| Packet Byte# | 7 | 6 | 5 | 4 | 3 | 2 | 1 | 0 |
|---|---|---|---|---|---|---|---|---|
| PB0 | Checksum | | | | | | | |
| PB1 | Vender Information | | | | | | | |
| PB2 | | | | | | | | |
| PB3 | | | | | | | | |
| PB4 | TYPE OF VIDEO FORMAT (No Information / 3D / 4k×2k / ···) | | | | | | | |
| PB5 | TYPE OF 3D SYSTEM (Frame Packing / Side-by-Side(Half) / ···) | | | | | | | |
| PB6-Nv | Reserved (0) | | | | | | | |

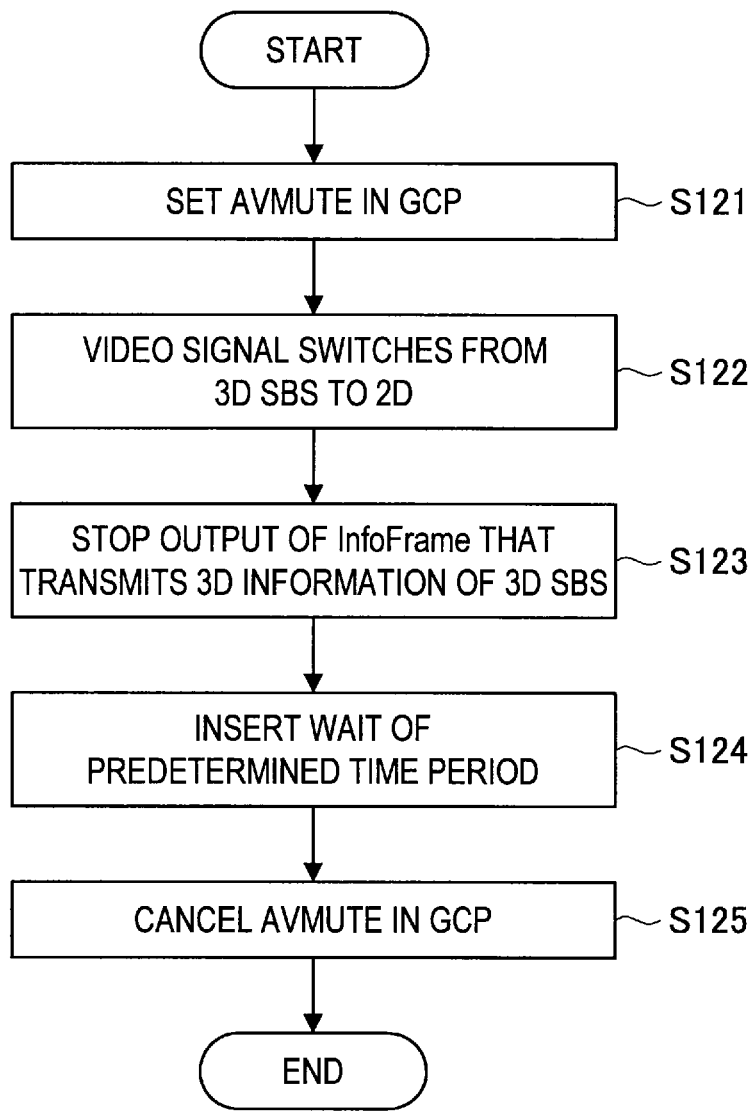

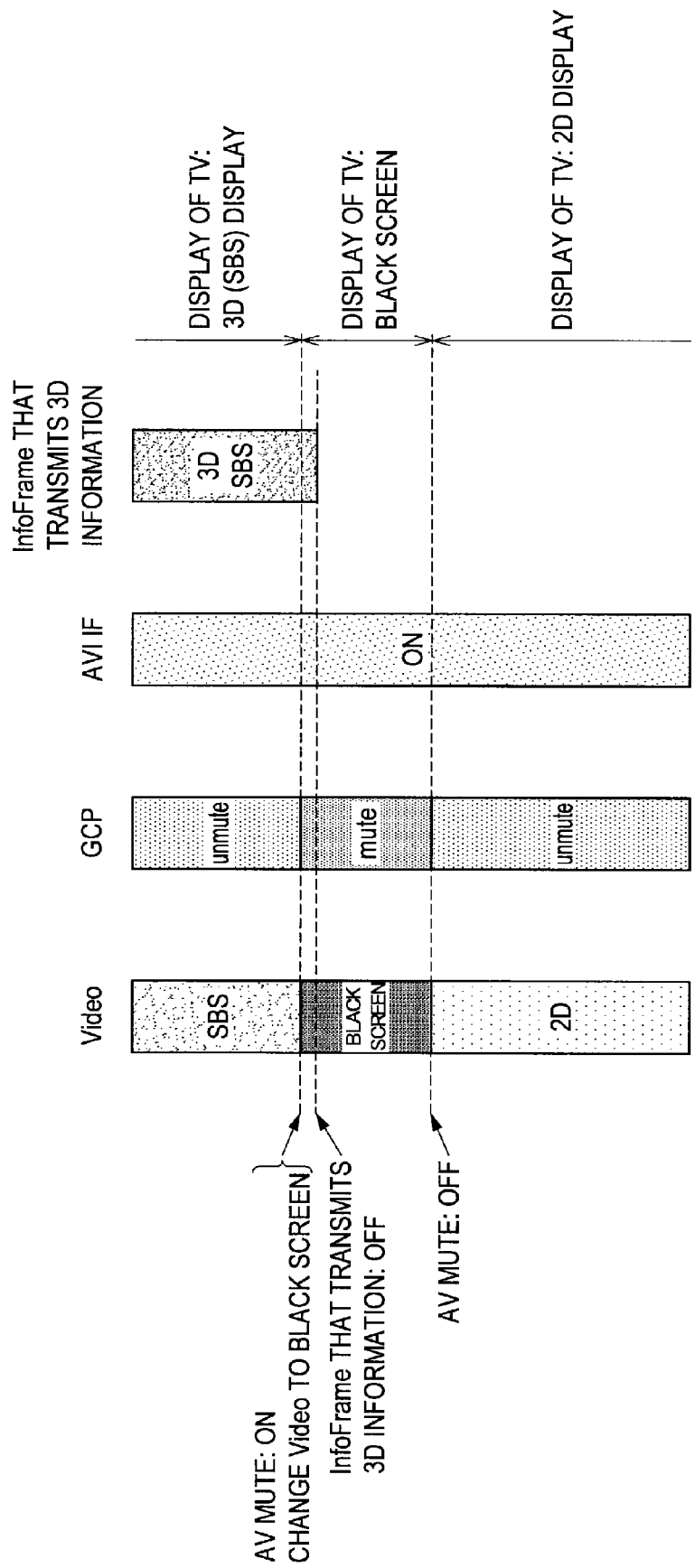

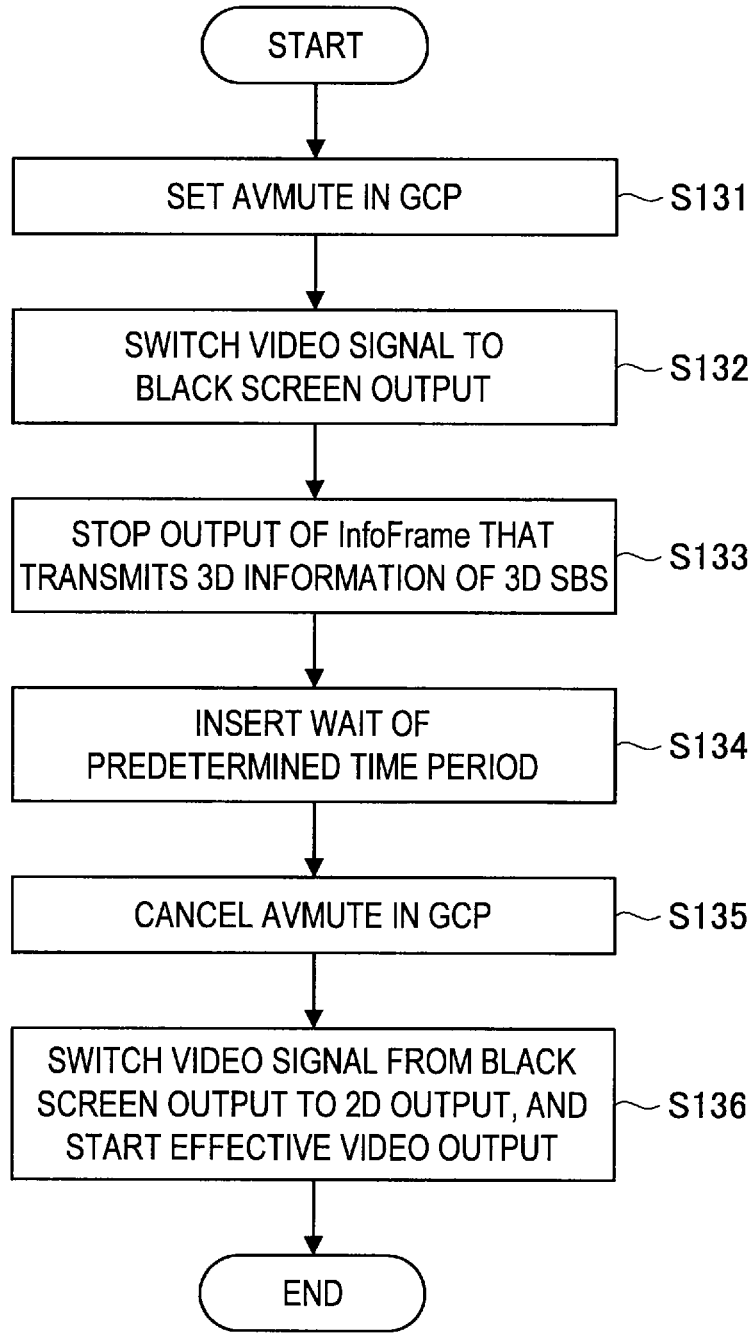

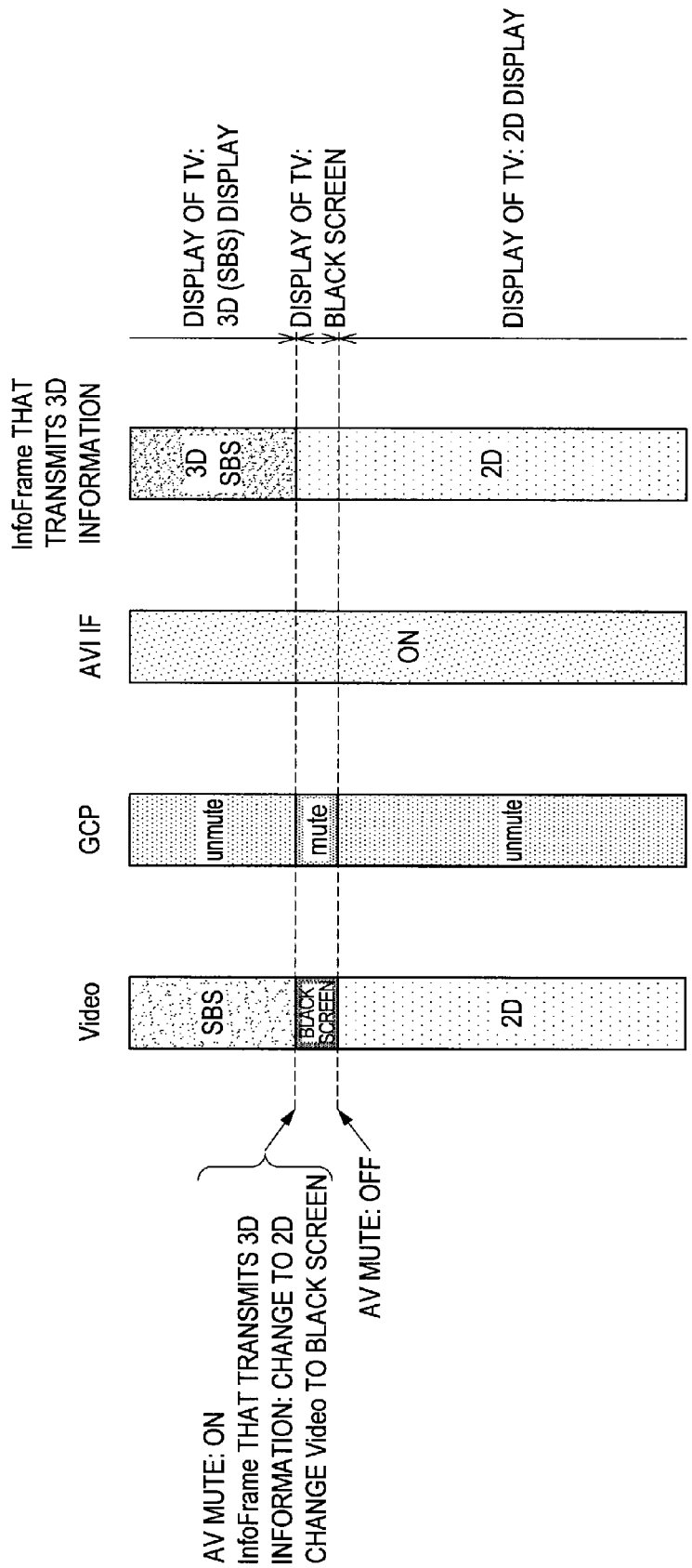

VIDEO TRANSMISSION DEVICE, VIDEO DISPLAY DEVICE, VIDEO DISPLAY SYSTEM, VIDEO TRANSMISSION METHOD AND COMPUTER PROGRAM

CROSS-REFERENCES TO RELATED APPLICATIONS

The present application is a national phase entry under 35 U.S.C. §371 of International Application No. PCT/JP2011/050161 filed Jan. 7, 2011, published on Jul. 21, 2011 as WO 2011/086977 A1, which claims priority from Japanese Patent Application No. JP 2010-005722 filed in the Japanese Patent Office on Jan. 14, 2010.

The present invention relates to a video transmission device, a video display device, a video display system, a video transmission method and a computer program.

TECHNICAL FIELD

The present invention relates to a video transmission device, a video display device, a video display system, a video transmission method and a computer program.

BACKGROUND ART

It is expected that a 3D broadcast service, which displays three-dimensional (3D) images on a screen and allows viewers to enjoy stereoscopic video, will be widely available from now on. Transmission methods for 3D video are defined in HDMI Ver. 1.4. In addition to a frame packing system, systems such as side by side (which is also referred to as Side By Side; SBS, or a side-by-side system) and the like are also defined as informative (reference information) systems. As transmission systems for 3D images, in addition to the side-by-side system, there are an over/under (which is also referred to as Over-Under, a vertical division system, Top/Bottom, Above/Below, or the like) system, a frame sequential (Frame Sequential; FSQ) system, and the like.

The frame packing system is a system that transmits left eye video and right eye video in pairs. The side-by-side system is a system that transmits video in a state in which the screen is divided into left and right halves. With a video display device that is compatible with the side-by-side system, it is possible to create stereoscopic video from divided left and right images. However, with a non-compatible video display device, a right eye image is displayed on the right side of the screen and a left eye image is displayed on the left side of the screen, respectively. The over/under system is a system that transmits video in a state in which the screen is divided into upper and lower halves. Similarly to the side-by-side system, with a video display device that is compatible with the over/under system, it is possible to create stereoscopic video from divided upper and lower images. However, with a non-compatible video display device, same images are displayed vertically symmetrically. The frame sequential system is a system that sequentially switches and outputs a right eye video stream and a left eye video stream in a time sharing manner.

When video transmitted by this type of 3D video transmission system is displayed, for example, by a time sharing stereoscopic video display system (refer to Patent Literatures 1 to 3, for example) that uses so-called shutter glasses, it is possible to cause the viewers to perceive the video as stereoscopic video. The frame packing system and the frame sequential system transmit two video images for the left eye and the right eye, and therefore, they are transmitted at a transfer rate that is twice that of 2D video transmission with the same resolution. With the side-by-side system and with the over/under system, left-eye 3D video and right-eye 3D video each have a half resolution, vertically or horizontally. Therefore, the 3D video as a whole is transmitted at the same transfer rate as that of the 2D video.

In determining a video format of the video transmitted by HDMI, the video format of 2D video can be determined from information, such as a pixel frequency of a video signal, timing information such as Hactive, Hblank, Vactive, Vblank and Vfreq, and VIC (Video Format Identification Code, resolution/frame rate information) in an AVI InfoFrame. However, in a case of 3D video, in addition to the above-described information, information such as an "InfoFrame that transmits 3D information" (which includes information indicating that 3D video is being transmitted, and information indicating a type of the 3D system of the video, such as Frame Packing, Side-by-Side (Half) or the like, refer for details to the HDMI standard Ver. 1.4, Chapter 8.2.3, Appendix H) as defined in the HDMI standard Ver. 1.4 is also necessary to identify the video format.

When the output resolution is changed between 2D video and 3D video, if switching is performed between 2D video and 3D video with the frame packing system, the video transfer rate also changes. Therefore, in a similar manner to a resolution change in 2D video (for example, switching between 720 p and 1080 p), it is necessary to temporarily stop the video signal output at the time of switching. When HDCP (a High-bandwidth Digital Content Protection system) is used for encryption and output is performed, HDCP authentication is necessary at the time of switching and a black screen appears for about one or two seconds.

On the other hand, when switching is performed between 2D video and 3D video with the side-by-side system, if the same image size and the same frame rate are used, video transfer rates are also the same. Therefore, without stopping the output of the video signal, the switching can be performed just by starting/stopping the output of the InfoFrame that transmits 3D information.

CITATION LIST

Patent Literature

Patent Literature 1: Japanese Patent Application Publication No. JP-A-9-138384
Patent Literature 2: Japanese Patent Application Publication No. JP-A-2000-36969
Patent Literature 3: Japanese Patent Application Publication No. JP-A-2003-45343

SUMMARY OF INVENTION

Technical Problem

However, in a case of a mixture of 3D video and 2D video, such as a television broadcast, a case is conceivable in which 3D video is used for a main part of a program and 2D video is used for a CM. There are cases in which switching between 3D video and 2D video is performed in a short time, such as in a case where switching is performed from the program main part (3D video/Side-by-Side) to the CM (2D video) and further, switching is performed again to the program main part (3D video/Side-by-Side). If, in each case, a black screen appears for about one or two seconds, there is a problem that a head portion of the video is not seen at the time of switching and this is not favorable. Note that, examples of cases in which a television broadcast is output via HDMI include: a case in which the television broadcast is received by a set top box, a HDD recorder or the like and is output as video to HDMI; and a case in which a television program recorded on a HDD or a disc is played back.

As described above, in a case of a format that performs transmission at the same resolution and frame rate as those of 2D video, such as Side-by-Side (Half) (or Over-Under (which is also referred to as Top/Bottom, Above/Below, or the like)), whether 2D video or 3D video is transmitted is basically determined based on whether or not there is an "InfoFrame that transmits 3D information". When the output is switched from 2D video to Side-by-Side (Half), if a source device starts sending of the InfoFrame that transmits 3D information, at a timing at which the video is switched from 2D video to Side-by-Side (Half), a repeater device and a sink device can detect a format change by detecting the InfoFrame that transmits 3D information.

On the other hand, when the output is switched from Side-by-Side (Half) to 2D video, the source device stops sending of the InfoFrame that transmits 3D information, at a timing at which the video is switched from Side-by-Side (Half) to 2D video. However, the HDMI standard defines that the InfoFrame that transmits 3D information be transmitted one or more times every two frames, and the InfoFrame that transmits 3D information does not necessarily exist in every frame. In addition, there is a possibility that detection of the InfoFrame that transmits 3D information fails due to a communication error, such as noise, an acquisition failure or the like. Therefore, only after the InfoFrame that transmits 3D information has not arrived in several frames consecutively, the repeater device and the sink device can determine that the InfoFrame that transmits 3D information has not arrived from the source device (rather than an acquisition failure or the like), and can determine that switching to 2D video has been performed.

In a case where the repeater device is interposed between the source device and the sink device, the repeater device stops sending of the InfoFrame that transmits 3D information of a transmission side of HDMI, after it is determined on a receiving side of HDMI that the InfoFrame that transmits 3D information has not arrived. For that reason, a time-out period is doubly necessary due to the repeater device, in addition to the sink device. Even if the source device stops sending of the InfoFrame that transmits 3D information at a timing at which the video is switched from Side-by-Side to 2D, the sink device can only determine after an actual video switching, that the InfoFrame that transmits 3D information has not arrived. As a result, there is a risk that 2D video is Side-by-Side processed in the sink device and is displayed as damaged 3D video. It is considerably unfavorable to perform Side-by-Side processing on 2D video and display it as damaged 3D video, and it is therefore best avoided as much as possible.

Further, from a viewpoint of the sink device side, it is best avoided as much as possible to perform the Side-by-Side processing on 2D video erroneously and display it as damaged 3D video, or to display the Side-by-Side video as 2D video. However, taking account of the broadcast (the set top box) and the like, it is not necessarily ensured that the source device (the set top box) sends out information of Side-by-Side video or 2D video as an InfoFrame accurately in synchronization with the video switching, and there is a risk that the switching is out of synchronization (advanced or delayed) by several frames. Further, as a result of an amplifier being interposed, there is a problem in which the fact that switching from Side-by-Side video to 2D video has been performed is transmitted with a delay to the sink device as the InfoFrame that transmits 3D information. Therefore, when the sink device, such as a television receiver, performs switching between Side-by-Side video and 2D video, there is a method for avoiding display of damaged video. In the method, a single color display like a black screen is used for the full screen for safety, or images (for example, images/patterns, such as cross stripes, a stripe pattern and the like, in which a left eye image (left half of the video) and a right eye image (right half of the video) have the same pattern) are displayed that are seen without a sense of discomfort regardless of whether being displayed as 2D or being displayed as Side-by-Side. However, there is also a problem that, if the display period of the black screen is too long, smooth viewing is hindered.

Thus, the present invention has been made in light of the above-described problems, and it is an object of the present invention to provide a video transmission device, a video display device, a video display system, a video transmission method and a computer program that are new and improved and that are capable of rapidly detecting video switching and providing smooth viewing when switching between 2D video and 3D video is performed.

Solution to Problem

According to an aspect of the present invention in order to solve the above-described problems, there is provided a video transmission device that includes: a transmission signal output portion that outputs a video signal that causes two-dimensional video or three-dimensional video to be displayed, an audio signal that causes audio to be output, and a control signal including information relating to the video signal and the audio signal; and a control portion that controls content of the control signal output from the transmission signal output portion. When the video signal switches from three-dimensional video to two-dimensional video, the control portion does not stop output of the video signal from the transmission signal output portion, and controls the transmission signal output portion such that information indicating that the video signal output from the transmission signal output portion has switched to two-dimensional video is included in information indicating that the video signal is three-dimensional video that is output from the transmission signal output portion.

The control portion may control the transmission signal output portion such that a mute signal is included in the control signal, the mute signal causing output of video to be stopped in a device that receives transmission of the video signal, for a predetermined time period from immediately before the video signal switches from three-dimensional video to two dimensional video or from a same timing as the switching.

When the video signal switches from three-dimensional video to two-dimensional video, the control portion may control the transmission signal output portion such that a video signal that causes video of a predetermined color and gray scale to be displayed is output.

The control portion may control the transmission signal output portion such that output of information explicitly indicating that the video signal is two-dimensional video is stopped, after an elapse of a predetermined time period from when the video signal switches from three-dimensional video to two-dimensional video.

According to another aspect of the present invention in order to solve the above-described problems, there is provided a video transmission device that includes: a transmission signal output portion that outputs a video signal that causes one of two-dimensional video and three-dimensional video to be displayed, an audio signal that causes audio to be output, and a control signal including information relating to the video signal and the audio signal; and a control portion that controls content of the control signal output from the transmission signal output portion. When the video signal switches between two-dimensional video and three-dimensional video, the control portion does not stop output of the video signal from the transmission signal output portion, and controls the transmission signal output portion such that output of information indicating that the video signal output from the transmission signal output portion is three-dimensional video is one of started and stopped.

When the video signal switches between two-dimensional video and three-dimensional video, the control portion may control the transmission signal output portion such that a mute signal is included in the control signal, the mute signal causing output of video to be stopped in a device that receives transmission of the video signal, for a predetermined time period from immediately before the switching or from a same timing as the switching.

When the video signal switches from three-dimensional video to two-dimensional video, the control portion may control the transmission signal output portion such that the time period of the mute signal is longer than when the video signal switches from two-dimensional video to three-dimensional video.

When the video signal switches between two-dimensional video and three-dimensional video, the control portion may control the transmission signal output portion such that a video signal that causes video of a predetermined color and gray scale to be displayed is output.

When the video signal switches from three-dimensional video to two-dimensional video, the control portion does not stop output of the video signal from the transmission signal output portion, and may control the transmission signal output portion such that information indicating that the video signal output from the transmission signal output portion has switched to two-dimensional video is included in information indicating that the video signal is three-dimensional video that is output from the transmission signal output portion.

According to another aspect of the present invention in order to solve the above-described problems, there is provided a video display device that includes: a transmission signal input portion that receives a video signal that causes one of two-dimensional video and three-dimensional video to be displayed, an audio signal that causes audio to be output, and a control signal including information relating to the video signal and the audio signal; a video display portion that displays video based on the video signal; and a video display control portion that controls an operation of the video display portion. When the transmission signal input portion detects that the video signal has switched from two-dimensional video to three-dimensional video or from three-dimensional video to two-dimensional video, the transmission signal input portion performs, with respect to the video display control portion, control that changes display of the video display portion to one of a black screen and an image of a predetermined color and gray scale.

According to another aspect of the present invention in order to solve the above-described problems, there is provided a video display system that includes: a video transmission device that transmits video; and a video display device that receives transmission of the video from the video transmission device and displays the video. The video transmission device includes: a transmission signal output portion that outputs a video signal that causes one of two-dimensional video and three-dimensional video to be displayed, an audio signal that causes audio to be output, and a control signal including information relating to the video signal and the audio signal; and a control portion that controls content of the control signal output from the transmission signal output portion. When the video signal switches from three-dimensional video to two-dimensional video, the control portion controls the transmission signal output portion such that information explicitly indicating that the video signal output from the transmission signal output portion is two-dimensional video is included in the control signal. The video display device includes: a transmission signal input portion that receives the video signal that causes one of two-dimensional video and three-dimensional video to be displayed, the audio signal that causes audio to be output, and the control signal including information relating to the video signal and the audio signal; a video display portion that displays video based on the video signal; and a video display control portion that controls an operation of the video display portion. When the transmission signal input portion detects that the video signal has switched from two-dimensional video to three-dimensional video or from three-dimensional video to two-dimensional video, the transmission signal input portion performs, with respect to the video display control portion, control that changes display of the video display portion to one of a black screen and an image of a predetermined color and gray scale.

According to another aspect of the present invention in order to solve the above-described problems, there is provided a video transmission method that includes: a transmission signal outputting step of outputting a video signal that causes one of two-dimensional video and three-dimensional video to be displayed, an audio signal that causes audio to be output, and a control signal including information relating to the video signal and the audio signal; and a control step of controlling content of the control signal output in the transmission signal outputting step. When the video signal switches from three-dimensional video to two-dimensional video, the control step does not stop output of the video signal, and performs control such that information explicitly indicating that the video signal output in the transmission signal outputting step is two-dimensional video is included in the control signal.

According to another aspect of the present invention in order to solve the above-described problems, there is provided a computer program that causes a computer to perform: a transmission signal outputting step of outputting a video signal that causes one of two-dimensional video and three-dimensional video to be displayed, an audio signal that causes audio to be output, and a control signal including information relating to the video signal and the audio signal; and a control step of controlling content of the control signal output in the transmission signal outputting step. When the video signal switches from three-dimensional video to two-dimensional video, the control step does not stop output of the video signal, and performs control such that information explicitly indicating that the video signal output in the transmission signal outputting step is two-dimensional video is included in the control signal.

Advantageous Effects of Invention

As described above, according to the present invention, it is possible to provide a video transmission device, a video display device, a video display system, a video transmission method and a computer program that are new and improved and that are capable of rapidly detecting video switching and providing smooth viewing when switching between 2D video and 3D video is performed.

BRIEF DESCRIPTION OF DRAWINGS

FIG. 10 is an explanatory diagram showing a data structure of a GCP in HDMI.

FIG. 15 is an explanatory diagram showing a data structure of an InfoFrame that transmits 3D information.

FIG. 18 is a flowchart illustrating a switching sequence from Side-by-Side video to 2D video.

FIG. 19 is an explanatory diagram showing a data flow when switching from Side-by-Side video to 2D video is performed.

FIG. 20 is a flowchart illustrating a switching sequence from Side-by-Side video to 2D video.

FIG. 21 is an explanatory diagram showing a data flow when switching from Side-by-Side video to 2D video is performed.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be made in the following order.

<1. Embodiment of the present invention>
[1-1. HDMI standard relating to 3D video]
[1-2. Configuration of video display system]
[1-3. Configuration of video player]
[1-4. Configuration of AV amplifier]
[1-5. Configuration of television receiver]
[1-6. Transmission of video data]
[1-6-1. Switching from 2D video to Side-by-Side video]
[1-6-2. Switching from Side-by-Side video to 2D video]
<2. Conclusion>

1. Embodiment of the Present Invention

[1-1. HDMI Standard Relating to 3D Video]

Figure 1:
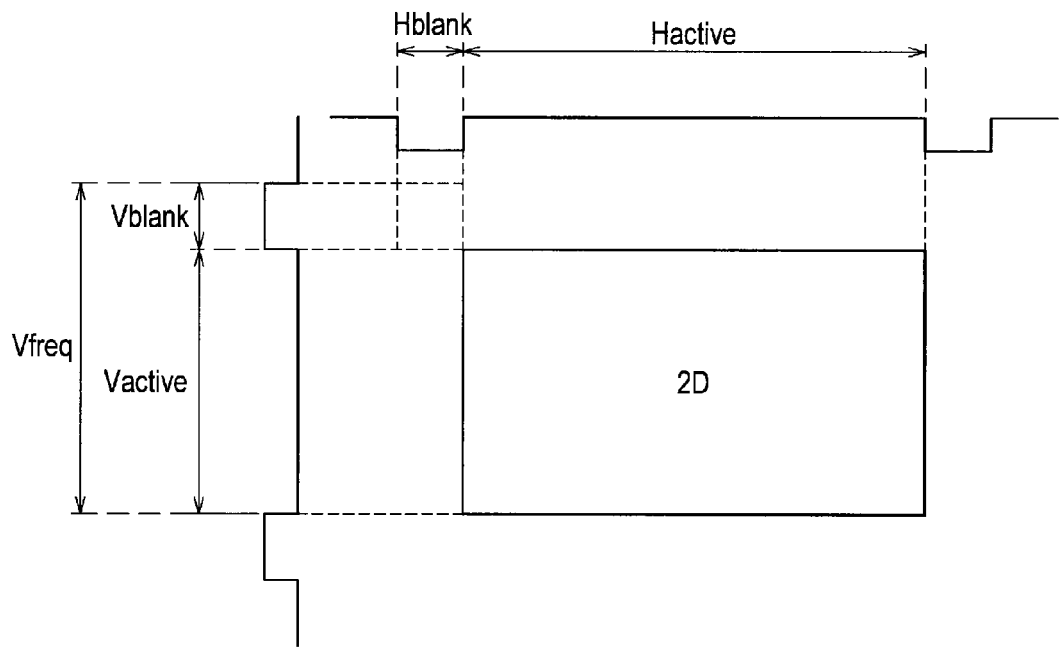
FIG. 1 is an explanatory diagram showing a 2D Video Format.
Figure 2:
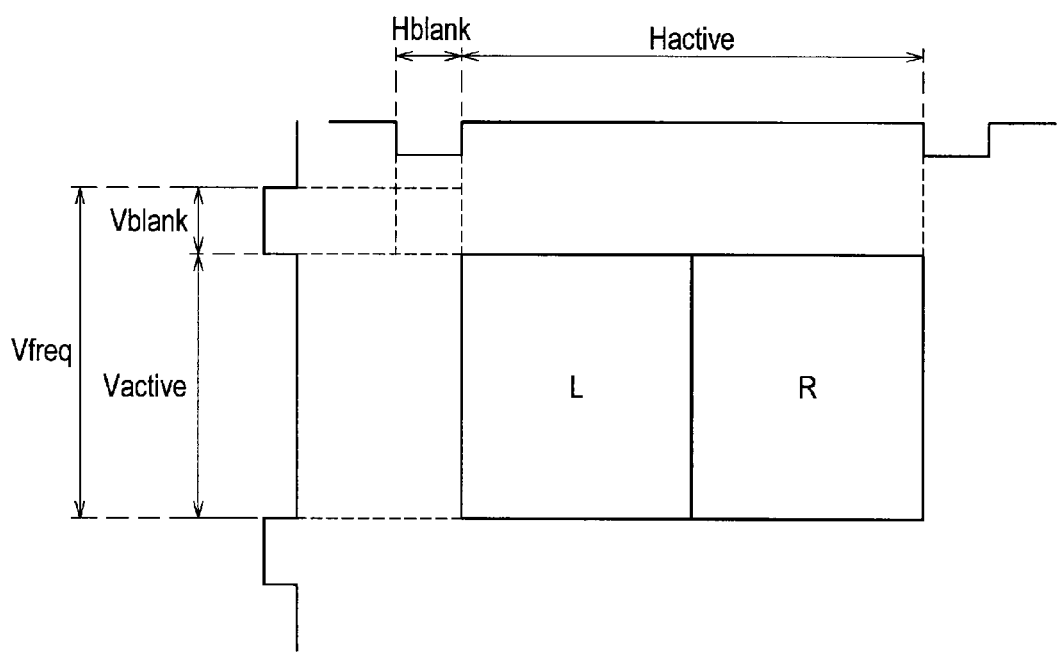
FIG. 2 is an explanatory diagram showing a Side-by-Side (Half) Video Format.

First, before describing a preferred embodiment of the present invention in detail, an HDMI standard relating to 3D video will be briefly described. In the HDMI Ver. 1.4 standard, a format called Side-by-Side (Half) is defined as an informative format. Side-by-Side (Half) is a format (a Side-by-Side (Half) Video Format) in which the width of 2D video such as that shown in FIG. 1 (a 2D Video Format) is compressed to half, and a left eye image (L) and a right eye image (R) are arranged side by side in a left-right direction as shown in FIG. 2.

In Side-by-Side (Half), the right eye image and the left eye image are arranged laterally with their width compressed to half. Therefore, timings (pixel frequency, Hblank, Hactive, Vblank, Vactive, Vfreq) of Video signals that are transmitted to HDMI are the same for both the 2D video and Side-by-Side (Half) video. In other words, it is difficult to distinguish between 2D video and Side-by-Side (Half) video based on the Video signal timings.

Figure 3:
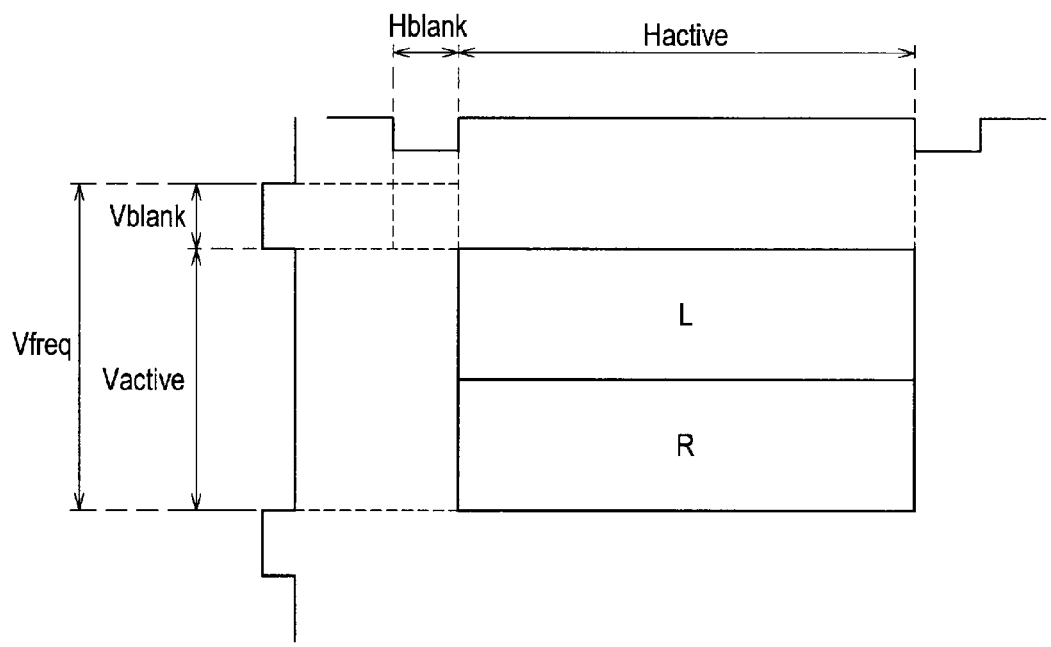
FIG. 3 is an explanatory diagram showing an Over-Under Video Format.

Note that, although not defined in the HDMI Ver. 1.4 standard, there are also systems, such as Top and bottom (which is also referred to as Over-Under, Above-Below, or the like) as shown in FIG. 3, Line-by-Line, Checkerboard and the like, which are formats that can transmit Video signals at the same timings as 2D video, like Side-by-Side (Half). When these formats are defined in the HDMI standard in the future, they can be used in a similar manner to Side-by-Side (Half).

[1-2. Configuration of Video Display System]

Hereinabove, the HDMI standard relating to 3D video is described. Next, configurations of a video display system according to the embodiment of the present invention will be described.

Figure 4:
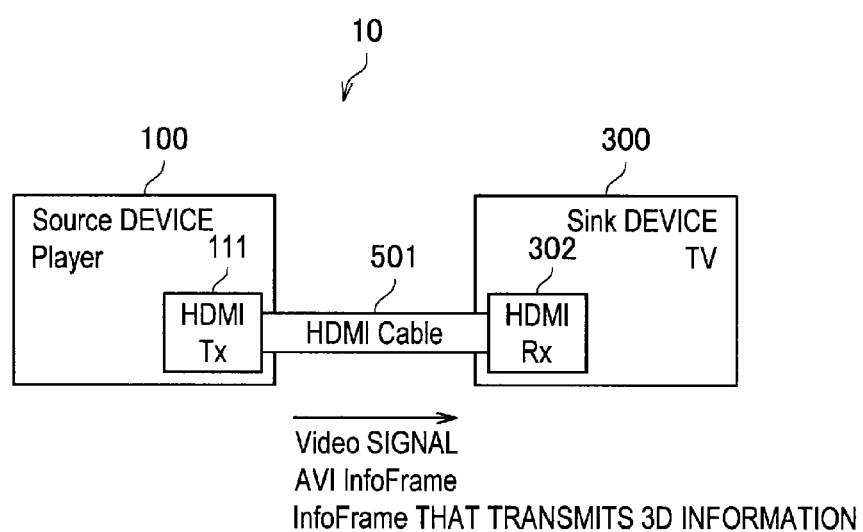
FIG. 4 is an explanatory diagram showing a configuration example of a video display system 10 according to an embodiment of the present invention.

FIG. 4 is an explanatory diagram showing a configuration example of a video display system 10 according to the embodiment of the present invention. The video display system 10 shown in FIG. 4 is configured to include a video player 100 and a television receiver 300. Among the respective devices in the video display system 10 shown in FIG. 4, the video player 100 is a source device and the television receiver 300 is a sink device. The video display system 10 shown in FIG. 4 has a configuration in which the video player 100 that is the source device and the television receiver 300 that is the sink device are directly connected by an HDMI cable 501.

An HDMI signal sent from an HDMI transmitting portion (HDMI Tx) 111 of the video player 100 that is the source device is directly transmitted to an HDMI receiving portion (HDMI Rx) 302 of the television receiver 300 that is the sink device. A Video signal, an AVI InfoFrame, and an InfoFrame that transmits 3D information (only when 3D video is transmitted) are transmitted from the video player 100 to the television receiver 300.

Figure 5:
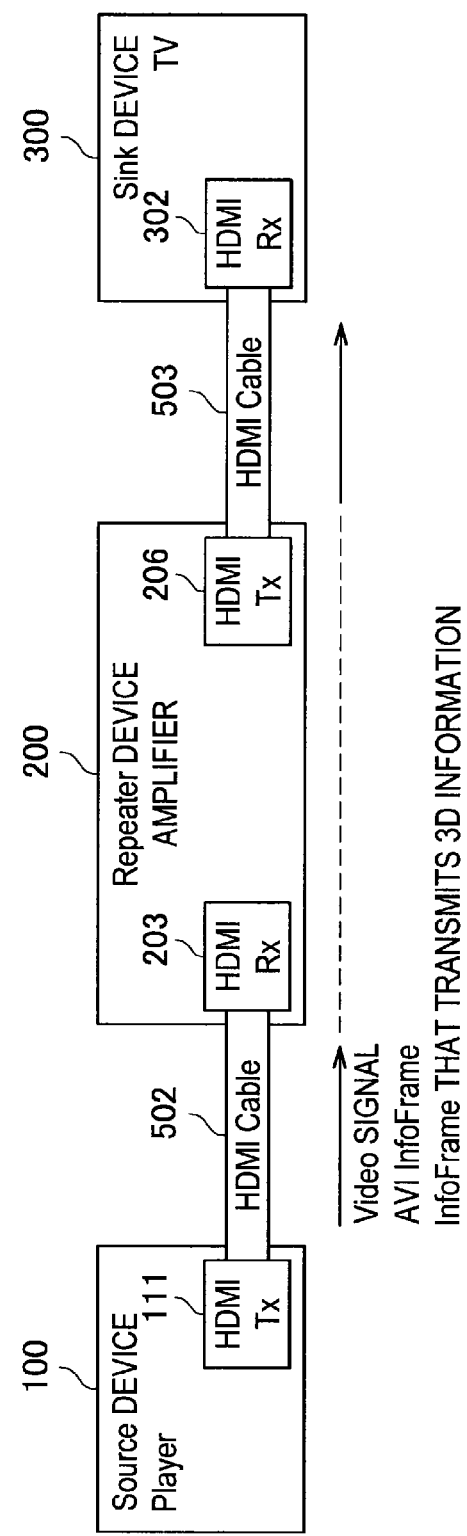
FIG. 5 is an explanatory diagram showing another configuration example of the video display system 10 according to the embodiment of the present invention.

FIG. 5 is an explanatory diagram showing another configuration example of the video display system 10 according to the embodiment of the present invention. The video display system 10 shown in FIG. 5 is configured to include the video player 100, an AV amplifier 200 and the television receiver 300. Among the respective devices in the video display system 10 shown in FIG. 5, the video player 100 is a source device, the AV amplifier 200 is a repeater device, and the television receiver 300 is a sink device. The video display system 10 shown in FIG. 5 has a configuration in which the video player 100 that is the source device and the AV amplifier 200 that is the repeater device are connected by an HDMI cable 502, and the AV amplifier 200 that is the repeater device and the television receiver 300 that is the sink device are connected by an HDMI cable 503.

An HDMI signal sent from the HDMI transmitting portion (HDMI Tx) 111 of the video player 100 that is the source device is transmitted to an HDMI receiving portion (HDMI Rx) 203 of the AV amplifier 200 that is the repeater device. A Video signal is transferred, inside the AV amplifier 200, from the HDMI receiving portion 203 to an HDMI transmitting portion (HDMI Tx) 206, and is transmitted from the HDMI transmitting portion 206 of the AV amplifier 200 to the HDMI receiving portion (HDMI Rx) 302 of the television receiver 300 that is the sink device. Only when there is a change in data received by the HDMI receiving portion 203 inside the AV amplifier 200 that is the repeater device, new data is set in a register of the HDMI transmitting portion 206 and an InfoFrame, such as an AVI InfoFrame, an InfoFrame that transmits 3D information, or the like, is transmitted from the HDMI transmitting portion (HDMI Tx) 206 to the HDMI receiving portion (HDMI Rx) 302 of the television receiver 300 that is the sink device.

The configurations of the video display system according to the embodiment of the present invention are described above. Next, a specific configuration of each of the devices that form the video display system will be described.

[1-3. Configuration of Video Player]

Figure 6:
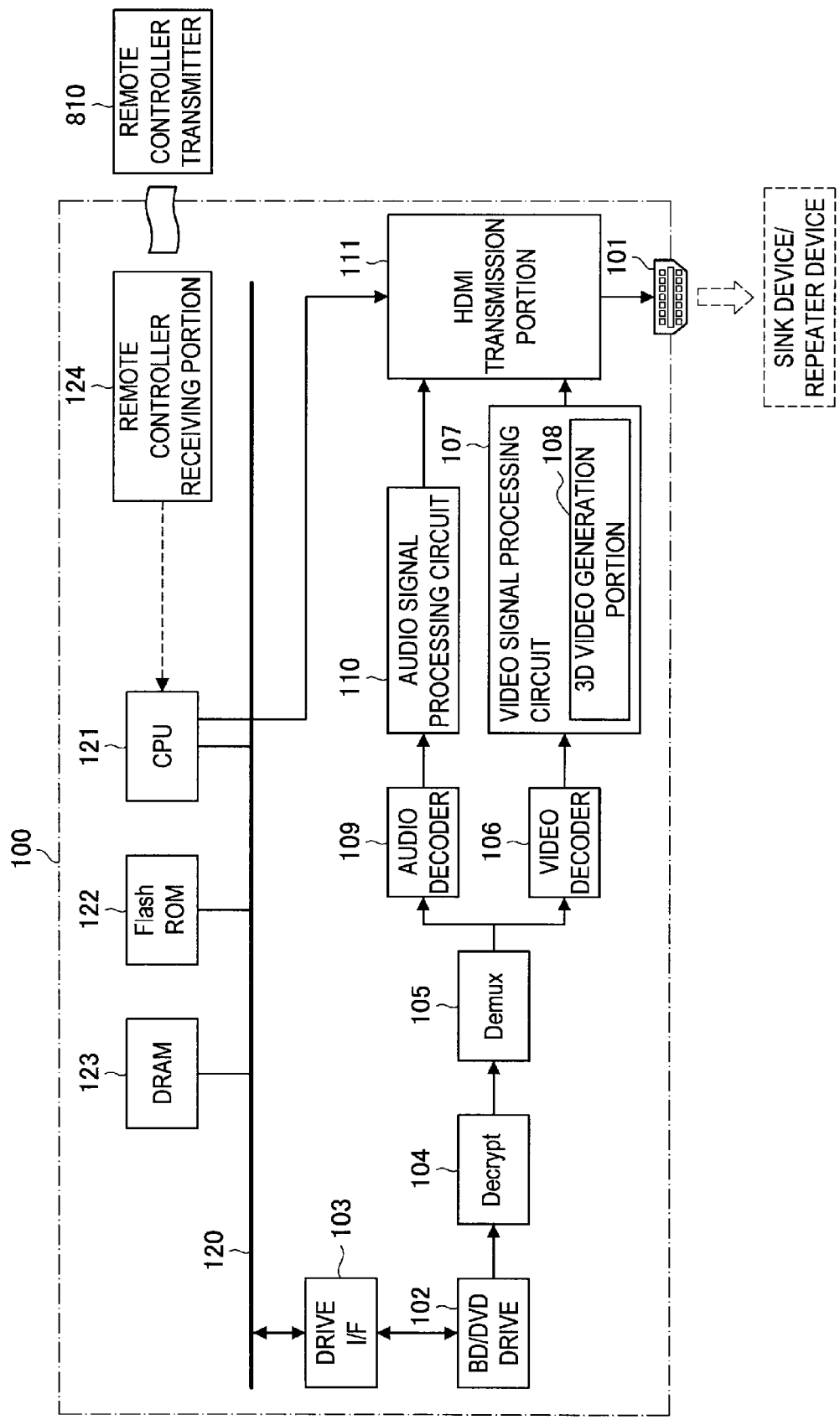
FIG. 6 is an explanatory diagram showing a configuration of a video player 100 according to the embodiment of the present invention.

FIG. 6 is an explanatory diagram showing a configuration of the video player 100 according to the embodiment of the present invention. Hereinafter, the configuration of the video player 100 according to the embodiment of the present invention will be described using FIG. 6.

As shown in FIG. 6, the video player 100 according to the embodiment of the present invention is configured to include an HDMI terminal 101, a BD/DVD drive 102, a drive I/F 103, a decoding portion 104, a demultiplexer 105, a video decoder 106, a video signal processing circuit 107, an audio decoder 109, an audio signal processing circuit 110, the HDMI transmitting portion 111, a CPU 121, a flash ROM 122, a DRAM 123 and a remote controller receiving portion 124.

The HDMI terminal 101 is a terminal to receive input of an HDMI signal from an HDMI cable or to output the HDMI signal to the HDMI cable. The BD/DVD drive 102 is a drive to read data from an optical disc, such as a DVD or the like. The data read out by the BD/DVD drive 102 is sent to the data decoding portion 104. The drive I/F 103 is an interface to perform control of the BD/DVD drive 102.

The decoding portion 104 is a portion that decodes the data read out by the BD/DVD drive 102 and converts the data to plain text, the data being encrypted by AACS (Advanced Access Content System), CSS (Content Scramble System) or the like. The data converted to the plain text by the decoding portion 104 is sent to the demultiplexer 105.

The demultiplexer 105 extracts, from among the data (a multiplexed stream) read out from the optical disc by the BD/DVD drive 102, elementary streams of video (MPEG, AVC, VC-1, MVC or the like), audio (Linear PCM, Dolby Digital, DTS or the like), and subtitles and the like.

The video decoder 106 is a decoder that decodes the video elementary stream of MPEG, AVC, VC-1, MVC or the like extracted by the demultiplexer 105, and obtains image data of each frame of the video. The image data decoded by the video decoder 106 is sent to the video signal processing circuit 107.

The video signal processing circuit 107 is a circuit that performs various types of video signal processing, such as image quality correction, image size/resolution conversion, video synthesis of Primary Video and Secondary Video, and color space conversion. Further, the video signal processing circuit 107 also superimposes an OSD on video. The video signal processing circuit 107 is configured to include a 3D video generation portion 108. When 3D video is output, the 3D video generation portion 108 converts the image data obtained from the video decoder, in accordance with a 3D output format. The video data on which various types of video signal processing have been performed in the video signal processing circuit 107 is sent to the HDMI transmitting portion 111.

The audio decoder 109 is a decoder that decodes the audio elementary stream (Linear PCM, Dolby Digital, DTS or the like) and converts it to Linear PCM. Further, in a case of Linear PCM, the audio decoder 109 also performs processing that rearranges audio channels. The audio signal processing circuit 110 performs audio signal processing, such as audio mixing of primary audio and secondary audio with interactive audio such as button sound, downmixing, sampling rate conversion and the like. The audio data on which various types of audio signal processing have been performed in the audio signal processing circuit 110 is sent to the HDMI transmitting portion 111.

The HDMI transmitting portion 111 is a portion that generates signals to be transmitted to the HDMI cables. The video data output from the video signal processing circuit 107 and the audio data output from the audio signal processing circuit 110 are input to the HDMI transmitting portion 111. Processing relating to the video format output from the HDMI transmitting portion 111, the content/timing of an output packet such as the InfoFrame, and resolution switching and the like is performed through the CPU 121 (or I$^2$C). The CPU 121 (or I$^2$C) also controls the content of the InfoFrame packet that transmits 3D information for Side-by-Side, and sending of a start/end timing of the InfoFrame that transmits 3D information.

The CPU 121 controls operations of the respective portions of the video player 100. The flash ROM 122 stores control software and holds data. The DRAM 123 forms a work area etc. of the CPU 121. The CPU 121 expands, on the DRAM 123, the software and data read out from the flash ROM 122 to activate the software, and controls the respective portions of the video player 100. The CPU 121, the flash ROM 122 and the DRAM 123 are connected to an internal bus 120.

The remote controller receiving portion 124 receives a remote control signal of infrared rays, for example, that is transmitted from a remote controller transmitter 810, and supplies it to the CPU 121. A user can operate the video player 100 by operating the remote controller transmitter 810.

Hereinabove, the configuration of the video player 100 according to the embodiment of the present invention is described using FIG. 6. Next, a configuration of the AV amplifier 200 according to the embodiment of the present invention will be described.

[1-4. Configuration of AV Amplifier]

Figure 7:
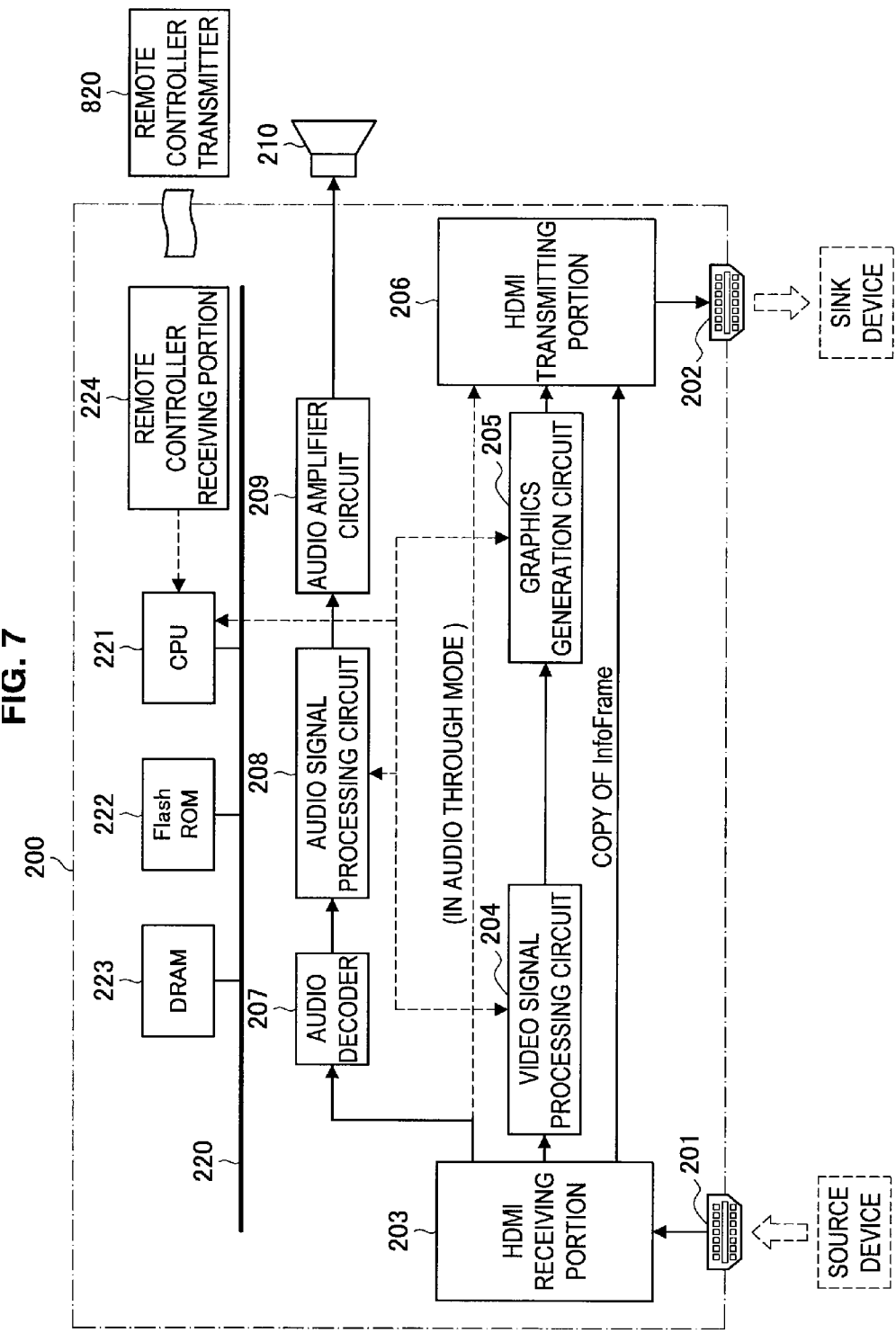
FIG. 7 is an explanatory diagram showing a configuration of an AV amplifier 200 according to the embodiment of the present invention.

FIG. 7 is an explanatory diagram showing the configuration of the AV amplifier 200 according to the embodiment of the present invention. Hereinafter, the configuration of the AV amplifier 200 according to the embodiment of the present invention will be described using FIG. 7.

As shown in FIG. 7, the AV amplifier 200 according to the embodiment of the present invention is configured to include HDMI terminals 201 and 202, the HDMI receiving portion 203, a video signal processing circuit 204, a graphics generation circuit 205, the HDMI transmitting portion 206, an audio decoder 207, an audio signal processing circuit 208, an audio amplifier circuit 209, a speaker 210, a CPU 221, a flash ROM 222, a DRAM 223 and a remote controller receiving portion 224.

The HDMI terminals 201 and 202 are terminals to receive input of the HDMI signal from the HDMI cable or to output the HDMI signal to the HDMI cable. The HDMI receiving portion 203 receives the HDMI signal and separates packets of respective signals of video, audio, InfoFrame and the like. In the present embodiment, the AV amplifier 200 is connected to the video player 100 via an HDMI cable that is not shown in the drawings. The HDMI receiving portion 203 receives the HDMI signal transmitted from the video player 100 and separates packets of respective signals of video, audio, InfoFrame and the like.

The video signal processing circuit 204 is a circuit that performs various types of video signal processing, such as image quality improvement, resolution conversion and the like. Further, the video signal processing circuit 204 also performs processing, such as conversion between various types of formats for 3D video, if necessary. The graphics generation circuit 205 superimposes an operation menu and various types of information display of the AV amplifier 200 on an input video signal and outputs it to the HDMI transmitting portion 206.

The HDMI transmitting portion 206 is a portion that generates signals to be transmitted to the HDMI cable connected to the HDMI terminal 202. The video data output from the video signal processing circuit 204 and the audio data output from the audio signal processing circuit 208 are input to the HDMI transmitting portion 206. Processing relating to the video format output from the AV amplifier 200, the content/timing of an output packet such as the InfoFrame, and resolution switching and the like is performed through the CPU 221 (or I²C). The CPU 221 also controls the content and the sending start/end timing of the InfoFrame packet that transmits 3D information for Side-by-Side.

The audio decoder 207 is a decoder that decodes the audio elementary stream (Linear PCM, Dolby Digital, DTS or the like) and converts it to Linear PCM.

The audio signal processing circuit 208 is a circuit that performs audio signal processing, such as sampling rate conversion, sound field correction and various types of sound quality improvement processing. The audio data on which various types of audio signal processing have been performed in the audio signal processing circuit 208 is sent to the audio amplifier circuit 209.

The audio amplifier circuit 209 is a circuit that performs D/A conversion to output audio to the speaker 210, or amplifies an analog signal in accordance with a set volume. The speaker 210 is a speaker that outputs audio based on the analog signal that has been D/A converted or amplified in the audio amplifier circuit 209.

The CPU 221 controls operations of the respective portions of the AV amplifier 200. The flash ROM 222 stores control software and holds data. The DRAM 223 forms a work area etc. of the CPU 221. The CPU 221 expands, on the DRAM 223, the software and data read out from the flash ROM 222 to activate the software, and controls the respective portions of the AV amplifier 200. The CPU 221, the flash ROM 222 and the DRAM 223 are connected to an internal bus 220.

The remote controller receiving portion 224 receives a remote control signal of infrared rays, for example, that is transmitted from a remote controller transmitter 820, and supplies it to the CPU 221. The user can operate the AV amplifier 200 by operating the remote controller transmitter 820.

An InfoFrame sent from the source device (the video player 100) is transferred to the sink device (the television receiver 300) after the content is partially checked by the AV amplifier 200 and the content has been changed. Further, the AV amplifier 200 according to the present embodiment has an operation mode called an audio through mode. The audio through mode is a mode to pass through audio data to the sink device side (the television receiver 300), without producing sound by the AV amplifier 200. When the AV amplifier 200 operates in the audio through mode, the audio data and audio-related packets, such as an Audio InfoFrame, received by the HDMI receiving portion 203 are transferred as they are to the sink device (the television receiver 300).

Hereinabove, the configuration of the AV amplifier 200 according to the embodiment of the present invention is described using FIG. 7. Next, configuration of the television receiver 300 according to the embodiment of the present invention will be described.

[1-5. Configuration of Television Receiver]

Figure 8:
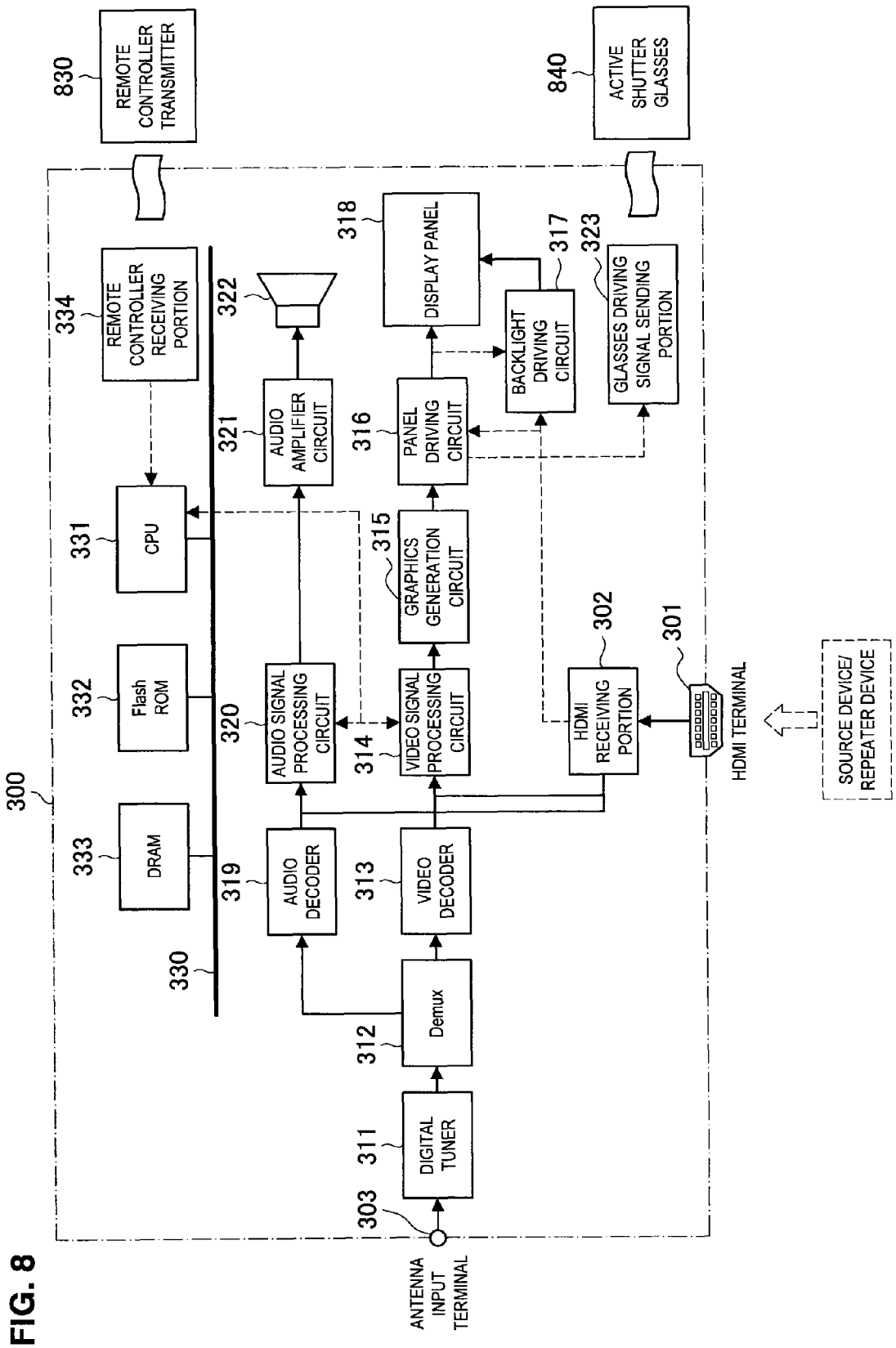
FIG. 8 is an explanatory diagram showing a configuration of a television receiver 300 according to the embodiment of the present invention.

FIG. 8 is an explanatory diagram showing a configuration of the television receiver 300 according to the embodiment of the present invention. Hereinafter, the configuration of the television receiver 300 according to the embodiment of the present invention will be described using FIG. 8.

As shown in FIG. 8, the television receiver 300 according to the embodiment of the present invention is configured to include an HDMI terminal 301, the HDMI receiving portion 302, an antenna input terminal 303, a digital tuner 311, a demultiplexer 312, a video decoder 313, a video signal processing circuit 314, a graphics generation circuit 315, a panel driving circuit 316, a backlight driving circuit 317, a display panel 318, an audio decoder 319, an audio signal processing circuit 320, an audio amplifier circuit 321, a speaker 322, a glasses driving signal sending portion 323, a CPU 331, a flash ROM 332, a DRAM 333 and a remote controller receiving portion 334.

The HDMI terminal 301 is a terminal to receive input of the HDMI signal from the HDMI cable or to output the HDMI signal to the HDMI cable. The HDMI receiving portion 302 is a portion that receives the HDMI signal and separates packets of respective signals of video, audio, InfoFrame and the like. Note that, if there is a change from 3D video (Side-by-Side) to 2D video or the reverse change in the InfoFrame that transmits 3D information, the HDMI receiving portion 302 may send a predetermined event to the panel driving circuit 316 or the backlight driving circuit 317 to stop video output.

The antenna input terminal 303 is a terminal that inputs a television broadcast signal that is received by a receiving antenna (not shown in the drawings). The digital tuner 311 processes the television broadcast signal input to the antenna terminal 310, and outputs a predetermined transport stream that corresponds to a channel selected by the user. The demultiplexer 312 extracts, from the transport stream obtained by the digital tuner 311, a partial TS (Transport Stream) (a TS packet of video data, a TS packet of audio data) that corresponds to the channel selected by the user. Further, the demultiplexer 312 extracts PSI/SI (Program Specific Information/Service Information) from the transport stream obtained by the digital tuner 311, and outputs it to the CPU 331. A plurality of channels are multiplexed on the transport stream obtained by the digital tuner 311. The processing performed by the demultiplexer 312 to extract the partial TS of a chosen channel from the transport stream is made possible by obtaining information of a packet ID (PID) of the chosen channel from PSI/SI (PAT/PMT).

The video decoder 313 performs decode processing on a video PES (Packetized Elementary Stream) packet that is formed by the TS packet of the video data obtained by the demultiplexer 312, and thereby obtains video data of each frame. The video signal processing circuit 314 performs, on the video data obtained by the video decoder 313, various types of video signal processing, such as image quality improvement, resolution conversion, I/P conversion and the like. The graphics generation circuit 315 superimposes the menu and information display of the television receiver 300 on the video data output from the video signal processing circuit 314. Further, the graphics generation circuit 315 generates image data by processing based on an application that is stored in advance in the flash ROM 332, and superimposes the image data on the video data output from the video signal processing circuit 314.

The panel driving circuit 316 generates a driving signal to drive the display panel 318, based on the video data output from the graphics generation circuit 315. The video data output from the graphics generation circuit 315 also includes timing information of video display on the display panel 318. Therefore, the panel driving circuit 316 delivers the timing information to the backlight driving circuit 317 and the glasses driving signal sending portion 323.

The backlight driving circuit 317 is a circuit that generates a driving signal to drive a backlight of the display panel 318, based on the timing information delivered from the panel driving circuit 316. When the backlight of the display panel 318 uses an LED (Light Emitting Diode) backlight system, the flashing timing of the backlight is controlled. The backlight driving circuit 317 may flash the backlight at a different timing/luminance for each of areas on the display panel 318.

The display panel 318 is formed by, for example, an LCD (Liquid Crystal Display), organic EL (Electro-Luminescence), a PDP (Plasma Display Panel) or the like.

The audio decoder 319 decodes the audio elementary stream (Linear PCM, AAC, Dolby Digital or the like) and converts it to Linear PCM.

The audio signal processing circuit 320 is a circuit that performs audio signal processing, such as audio mixing of video's audio and sound effects such as operation sound, downmixing, sampling rate conversion, sound field correction and various types of sound quality improvement processing. The audio data on which various types of audio signal processing have been performed in the audio signal processing circuit 320 is sent to the audio amplifier circuit 321.

The audio amplifier circuit 321 is a circuit that performs D/A conversion to output audio to the speaker 322, or amplifies an analog signal in accordance with a set volume. The speaker 322 is a speaker that outputs audio based on the analog signal that has been D/A converted or amplified in the audio amplifier circuit 321.

The glasses driving signal sending portion 323 is a portion that sends a timing signal to drive active shutter glasses 840. The active shutter glasses 840 receives the signal sent from the glasses driving signal sending portion 323, and opens or closes shutters (liquid crystal shutters, for example) of left and right lenses of the glasses in accordance with the timing of the signal. The user sees video displayed on the display panel 318 through the active shutter glasses 840 so that the video displayed on the display panel 318 can be seen as 3D video.

The CPU 331 controls operations of the respective portions of the television receiver 300. The flash ROM 332 stores control software and holds data. The DRAM 333 forms a work area etc. of the CPU 331. The CPU 331 expands, on the DRAM 333, the software and data read out from the flash ROM 332 to activate the software, and controls the respective portions of the television receiver 300. The CPU 331, the flash ROM 332 and the DRAM 333 are connected to an internal bus 330. Note that the CPU 331, the flash ROM 332 and the DRAM 333 may be a microcomputer of one chip (a one-chip microcomputer).

The remote controller receiving portion 334 receives a remote control signal of infrared rays, for example, that is transmitted from a remote controller transmitter 830, and supplies it to the CPU 331. The user can operate the television receiver 300 by operating the remote controller transmitter 830.

The operations of the television receiver 300 shown in FIG. 8 will be described briefly. A television broadcast signal input to the antenna input terminal 303 is supplied to the digital tuner 311. In the digital tuner 311, the television broadcast signal is processed and a transport stream corresponding to a channel selected by the user is obtained. The transport stream is supplied to the demultiplexer 312. The demultiplexer 312 extracts, from the transport stream, a partial TS (a TS packet of video data, a TS packet of audio data) corresponding to the channel selected by the user. This partial TS is sent to the video decoder 313 and the audio decoder 319.

In the video decoder 313, decode processing is performed on a video PES packet that is formed by the TS packet of the video data obtained by the demultiplexer 312, and video data of each frame is obtained. The video data is subjected to various types of video signal processing, such as image quality improvement, resolution conversion, I/P conversion and the like, in the video signal processing circuit 314. Then, it is superimposed on the menu and information display of the television receiver 300 that is generated by the graphics generation circuit 315, and is output to the panel driving circuit 316. An image corresponding to the channel selected by the user is displayed on the display panel 318.

In the audio decoder 319, the elementary stream (Linear PCM, AAC, Dolby Digital or the like) of the audio data obtained by the demultiplexer 312 is decoded and converted to Linear PCM. The audio data is subjected to necessary processing, such as D/A conversion, in the audio signal processing circuit 320, further amplified by the audio amplifier circuit 321, and thereafter supplied to the speaker 322. Therefore, the audio corresponding to the channel selected by the user is output from the speaker 322.

In the HDMI receiving portion 302, video and audio data input to the HDMI terminal 301 via the HDMI cable are obtained. The video data is supplied to the video signal processing circuit 314. The audio data is supplied to the audio signal processing circuit 320. After that, operations are performed in a similar manner to the above-described operations performed when receiving the television broadcast signal. Thus, an image is displayed on the display panel 318 and audio is output from the speaker 322.

Hereinabove, the configuration of the television receiver 300 according to the embodiment of the present invention is described using FIG. 8. Next, video data that is transmitted in the video display system according to the embodiment of the present invention will be described.

[1-6. Transmission of Video Data]

[1-6-1. Switching from 2D Video to Side-by-Side Video]

Figure 9:
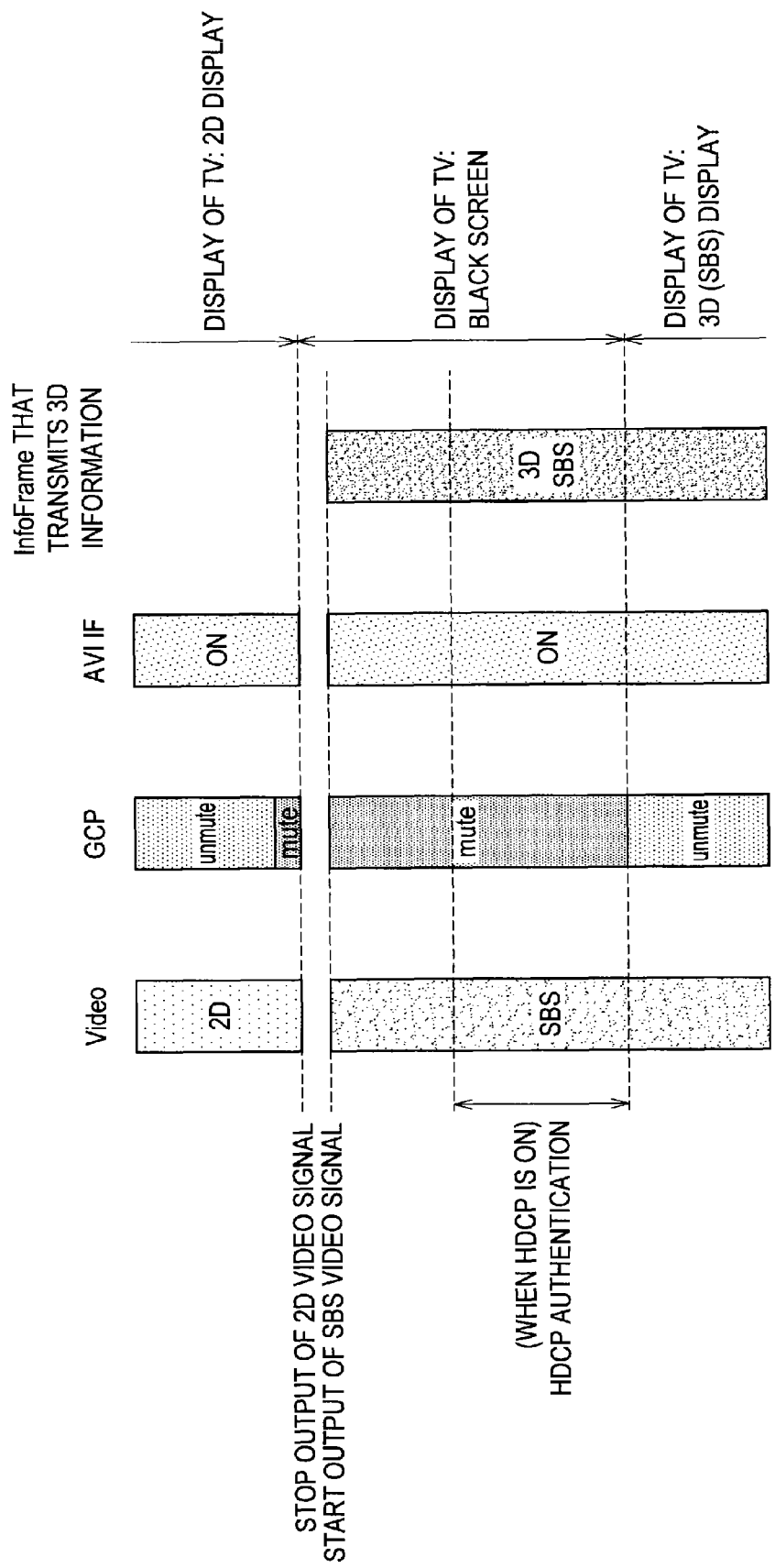
FIG. 9 is an explanatory diagram showing a data flow when switching from 2D video to Side-by-Side video is performed.

First, a transmission sequence of video data that is transmitted in the video display system when switching from 2D video to Side-by-Side video will be described. First, known video data transmission will be described. FIG. 9 is an explanatory diagram showing a known transmission sequence of video data when switching from 2D video to Side-by-Side video is performed. FIG. 9 indicates that time flows from top to bottom of the drawing. "Video" indicates a video signal sequence, "GCP" indicates a sequence of data of a GCP (General Control Packet), "AVI IF" indicates a sequence of an AVI (Auxiliary Video Information) InfoFrame, and "InfoFrame that transmits 3D information" indicates a sequence of data of an InfoFrame that transmits 3D information.

In known art, as shown in FIG. 9, when switching from 2D video to Side-by-Side video is performed, the output of a video signal of Side-by-Side video is started after the output of a video signal of 2D video is temporarily stopped. When HDCP is enabled and transmission is performed, a format change is performed after HDCP authentication is performed between the source device and the sink device.

A switching sequence from 2D video to Side-by-Side video shown in FIG. 9 will be described. In order to switch from 2D video to Side-by-Side video, first, the source device that outputs a video source sets AVMUTE in the GCP and sends the GCP. Specifically, in a General Control Subpacket of the GCP shown in FIG. 10, the source device sets Set_AVMUTE to 1 and sets Clear_AVMUTE to 0. In a section indicated by "mute" of the GCP in FIG. 9, this packet has been output from the source device.

Next, outputs of the video signal (Video) of 2D video and various types of packets (the GCP and the AVI InfoFrame) are stopped, and after a predetermined time period has elapsed, outputs of the video signal of Side-by-Side video and various types of packets (the GCP, the AVI InfoFrame, and the InfoFrame that transmits 3D information) are started. Here, if HDCP is enabled and the outputs are performed, the HDCP authentication is performed. When the HDCP authentication is completed, the source device that outputs the video source cancels AVMUTE in the GCP. Specifically, the source device sets Clear_AVMUTE to 1 and sets Set_AVMUTE to 0 in the General Control Subpacket of the GCP shown in FIG. 10. In a section indicated by "unmute" of the GCP in FIG. 9, this packet has been output from the source device.

Since switching from 2D video to Side-by-Side 3D video is performed in this manner, the switching is performed stably and safely. However, when HDCP is enabled, a black screen appears for about two seconds. Therefore, there is a problem that it takes a long time to switch from 2D video to Side-by-Side 3D video.

To address this, the present embodiment aims to reduce the switching time by performing switching from 2D video to Side-by-Side 3D video without stopping the output of the video signal from the source device and without performing the HDCP authentication.

Figure 11:
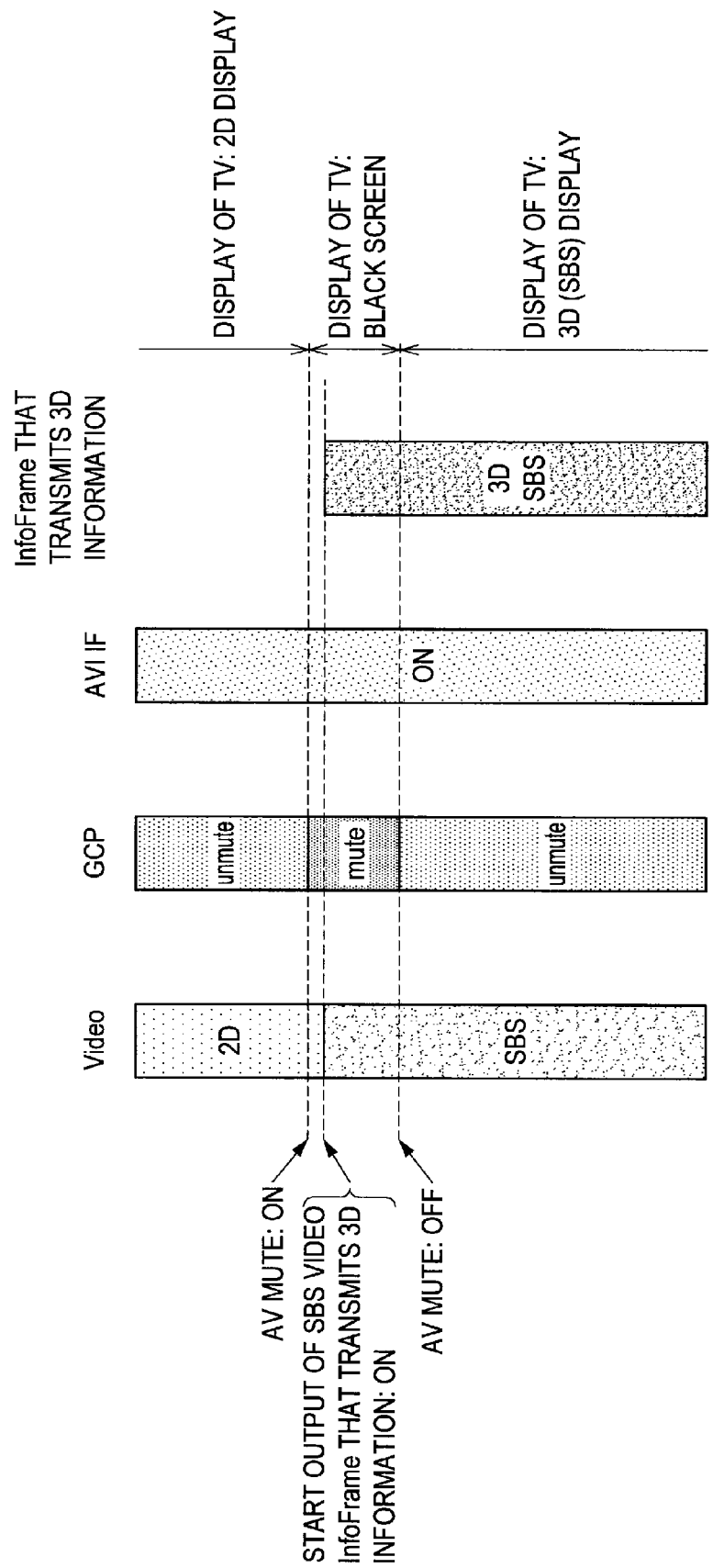
FIG. 11 is an explanatory diagram showing a data flow when switching from 2D video to Side-by-Side video is performed.

FIG. 11 is an explanatory diagram showing video data transmission in the present embodiment when switching from 2D video to Side-by-Side video is performed. As shown in a sequence shown in FIG. 11, the video data transmission in the present embodiment aims to reduce the switching time by performing switching from 2D video to Side-by-Side 3D video without stopping the output of the video signal from the source device and without performing the HDCP authentication.

Figure 12:
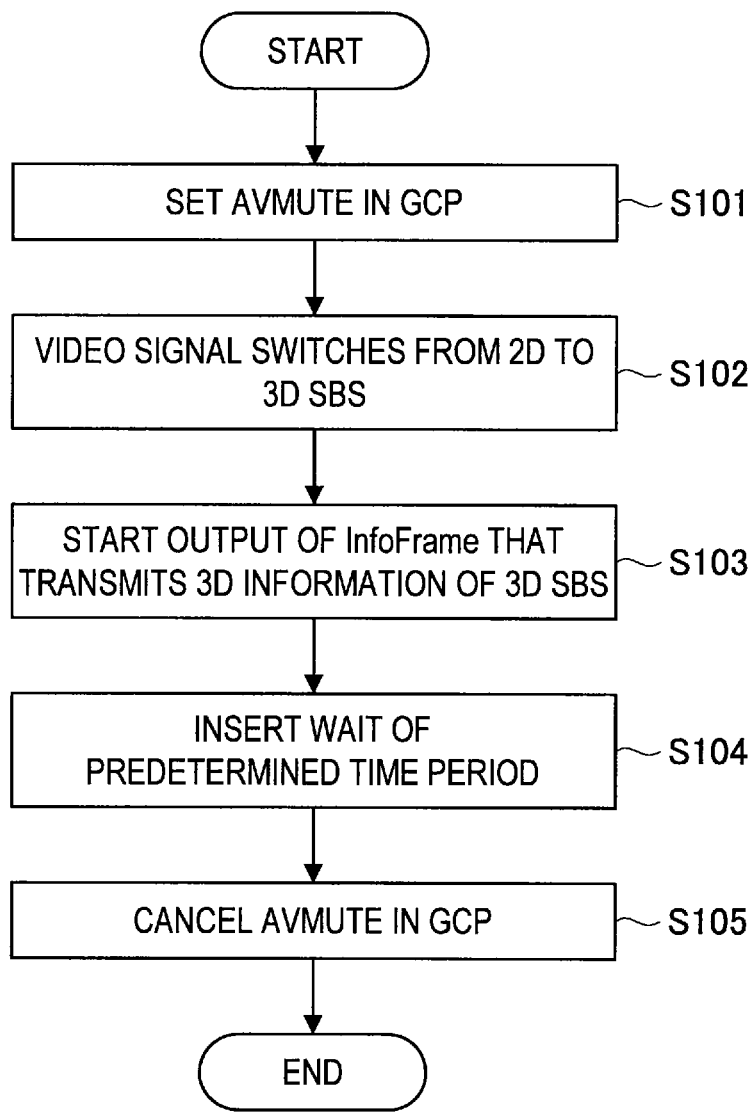
FIG. 12 is a flowchart illustrating a switching sequence from 2D video to Side-by-Side video.

FIG. 12 is a flowchart illustrating a switching sequence from 2D video to Side-by-Side video in the present embodiment. The switching sequence from 2D video to Side-by-Side video in the present embodiment will be described using FIG. 11 and FIG. 12.

First, the source device (the video player 100) that outputs the video source sets AVMUTE in the GCP, and sends the GCP from the HDMI transmitting portion 111 (step S101). Specifically, the source device (the video player 100) sets Set_AVMUTE to 1 and sets Clear_AVMUTE to 0, in the General Control Subpacket of the GCP shown in FIG. 10. In a section indicated by "mute" of the GCP shown in FIG. 11, this packet has been output from the source device.

When AVMUTE is set in the GCP at step S101 described above, the video output from the source device (the video player 100) switches from 2D video to 3D/Side-by-Side (3D SBS) video (step S102). Note that the setting of AVMUTE in the GCP at step S101 may be performed at the same timing (in the same frame) as the switching of the video from 2D video to Side-by-Side video.

When the video output from the source device (the video player 100) switches from 2D video to Side-by-Side video at step S102 described above, the source device (the video player 100) starts output of the InfoFrame that transmits 3D information of Side-by-Side video, from the HDMI transmitting portion 111 (step S103). Data content of "3D SBS" in the InfoFrame that transmits 3D information is content in which "3D" is set as a video format type and "Side-by-Side (Half)" is set as a 3D system type in the data of the packet of the "InfoFrame that transmits 3D information" shown in FIG. 15. In the television receiver 300 that displays the video transmitted from the video player 100, in order to wait for a video processing mode to switch from 2D video to Side-by-Side video, a wait of a predetermined time period is inserted (step S104).

When the predetermined time period has elapsed from the start of the wait, the source device (the video player 100) that transmits the video source cancels AVMUTE in the GCP, and sends the GCP from the HDMI transmitting portion 111 (step S105). Specifically, the source device (the video player 100) sets Clear_AVMUTE to 1 and sets Set_AVMUTE to 0, in the General Control Subpacket of the GCP shown in FIG. 10. In a section indicated by "unmute" of the GCP in FIG. 11, this packet has been output from the source device.

In this manner, the content of the packet that is output via HDMI from the source device (the video player 100) is controlled when switching from 2D video to Side-by-Side video. Thus, it is possible to quickly perform video switching in the sink device (the television receiver 300), as compared to a case in which the HDCP authentication is performed.

However, if AVMUTE does not effectively work in the sink device (the television receiver 300), the sink device (the television receiver 300) performs Side-by-Side processing on 2D video erroneously, and there is a possibility that video will be displayed in disorder at least temporarily.

Given this, in order to switch video from 2D video to Side-by-Side video more safely than in the sequence shown in FIG. 11, the video signal output from the source device (the video player 100) is switched from 2D video to a black screen (or an image of a predetermined color/gray-scale), in a section where AVMUTE has been set in the GCP. Then, when AVMUTE is cancelled in the GCP, the video signal output from the source device (the video player 100) is switched from the black screen to Side-by-Side video. This is because the source device (the video player 100) has no way to ascertain the level of accuracy at which the sink device (the television receiver 300) side responds to the timing of switching from 2D video to Side-by-Side video, and therefore it is preferable for the source device side to output the black screen (or an image of a single color on the whole screen, an image that can be seen without a sense of discomfort regardless of whether display is performed as 2D or Side-by-Side) between the videos at the switching timing, for the sake of safety. By switching the video data and the packet in this manner, it is possible to perform the video switching from 2D video to Side-by-Side video more safely than in the sequence shown in FIG. 11.

Figure 13:
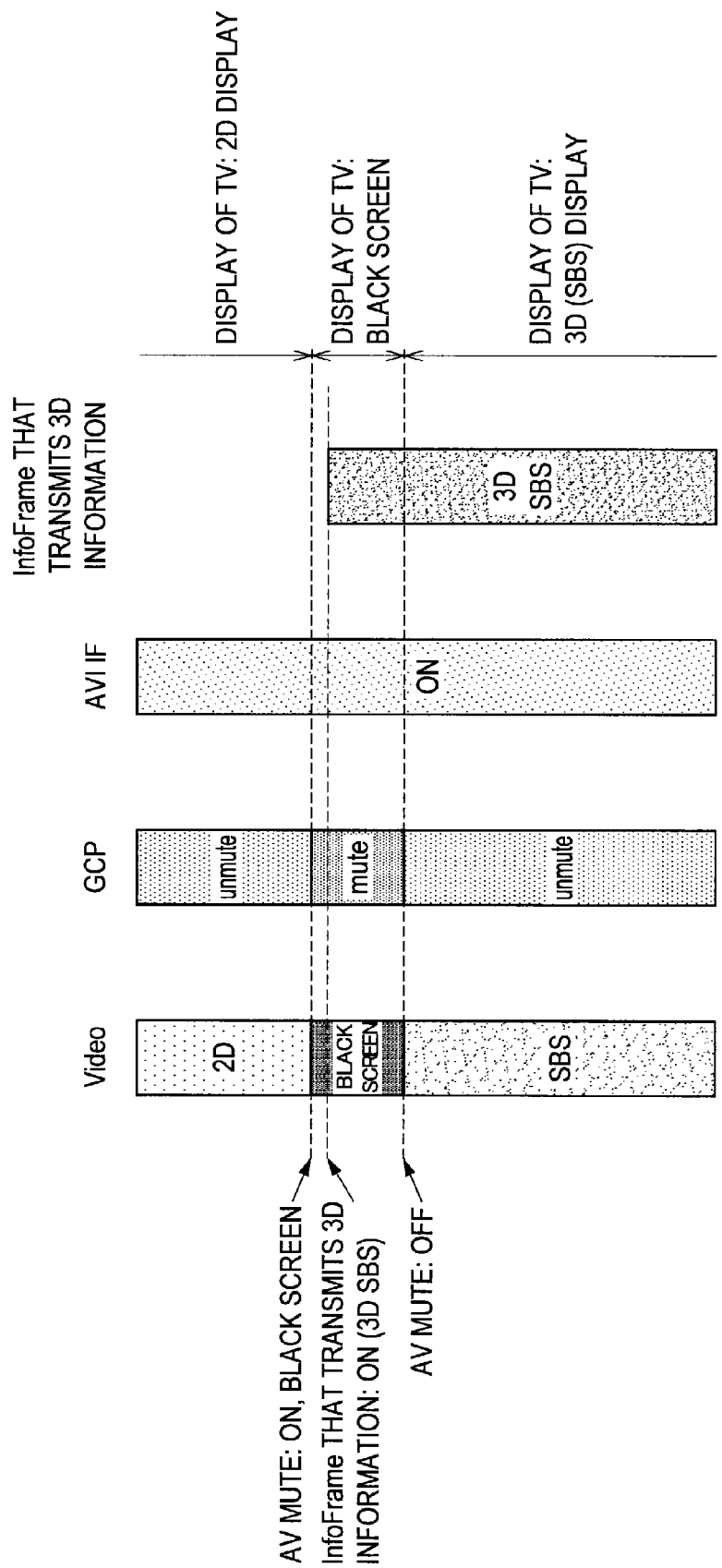
FIG. 13 is an explanatory diagram showing a data flow when switching from 2D video to Side-by-Side video is performed.

FIG. 13 is an explanatory diagram showing another example of video data transmission in the present embodiment when switching from 2D video to Side-by-Side video is performed. As shown in FIG. 13, the other example of video data transmission in the present embodiment aims to reduce the switching time by performing switching from 2D video to Side-by-Side 3D video without stopping the output of the video signal from the source device and without performing the HDCP authentication. Further, by interposing a black screen period when video is switched from 2D video to Side-by-Side video, it is possible to perform the video switching from 2D video to Side-by-Side video more safely than in the sequence shown in FIG. 11.

Figure 14:
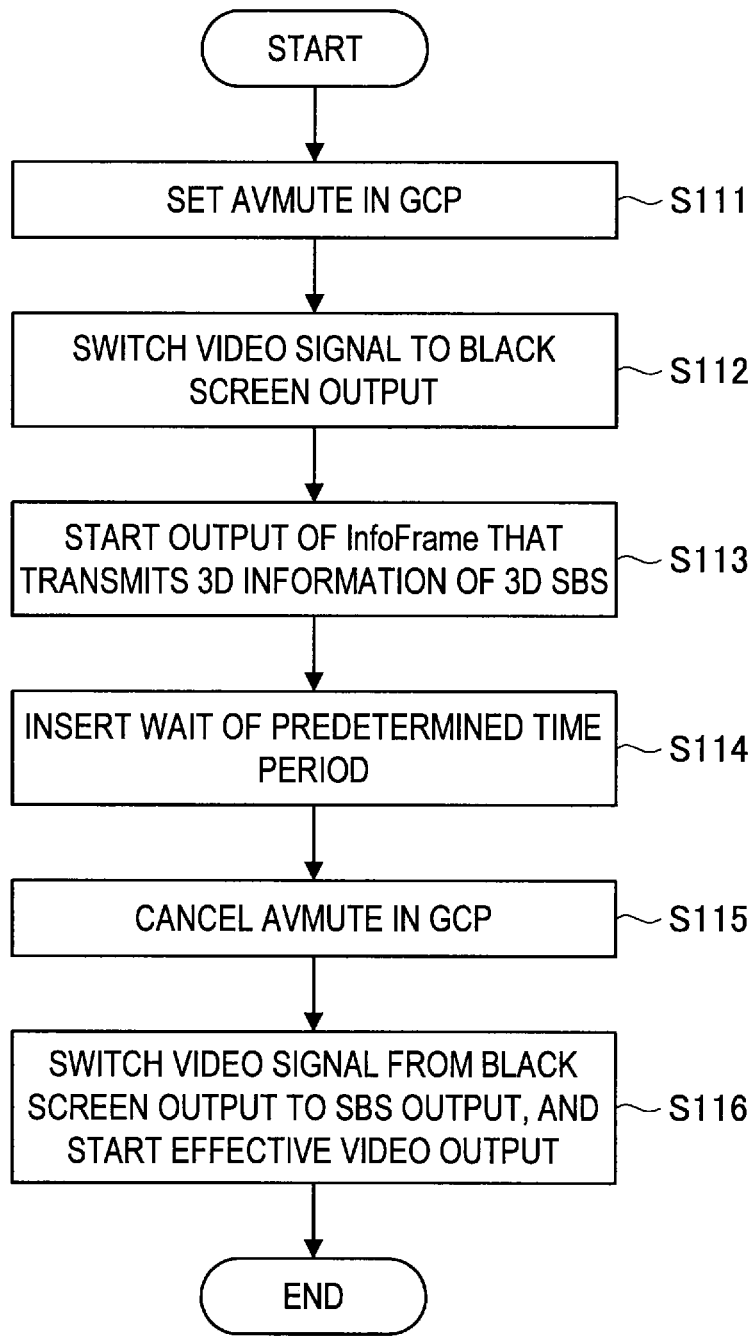
FIG. 14 is a flowchart illustrating a switching sequence from 2D video to Side-by-Side video.

FIG. 14 is a flowchart illustrating a switching sequence from 2D video to Side-by-Side video in the present embodiment. The switching sequence from 2D video to Side-by-Side video in the present embodiment will be described using FIG. 13 and FIG. 14.

First, the source device (the video player 100) that outputs the video source sets AVMUTE in the GCP and sends the GCP from the HDMI transmitting portion 111 (step S111). Specifically, the source device (the video player 100) sets Set_AVMUTE to 1 and sets Clear_AVMUTE to 0, in the General Control Subpacket of the GCP shown in FIG. 10. In a section indicated by "mute" of the GCP in FIG. 13, this packet has been output from the source device.

When AVMUTE is set in the GCP at step S111 described above, the video output from the source device (the video player 100) switches from 2D video to a black screen (step S112). Note that the setting of AVMUTE in the GCP at step S111 may be performed at the same timing (in the same frame) as the video switching from 2D video to the black screen, or the switching may be performed ahead of the setting of AVMUTE in the GCP.

When the video output from the source device (the video player 100) switches from 2D video to the black screen at step S112 described above, the source device (the video player 100) starts output of the InfoFrame that transmits 3D information of Side-by-Side video, from the HDMI transmitting portion 111 (step S113). Data content of "3D SBS" in the InfoFrame that transmits 3D information is content in which "3D" is set as a video format type and "Side-by-Side (Half)" is set as a 3D system type in the data of the packet of the "InfoFrame that transmits 3D information" shown in FIG. 15. In the television receiver 300 that displays the video transmitted from the video player 100, in order to wait for the video processing mode to switch from 2D video to Side-by-Side video, a wait of a predetermined time period is inserted (step S114).

The sink device (the television receiver 300) detects that the sending of the InfoFrame that transmits 3D information is started by the source device, and switches internal portions of the sink device (the television receiver 300) to a mode that processes Side-by-Side video (a Side-by-Side mode) and to a mode that displays 3D video (a 3D display mode). Specifically, the HDMI receiving portion 302 switches the video signal processing circuit 314 and the graphics generation circuit 315 to the Side-by-Side mode, and switches the panel driving circuit 316 to the 3D display mode. Further, in a case of a 3D television receiver that uses an active shutter glasses system like the television receiver 300 according to the present embodiment, the HDMI receiving portion 302 causes the glasses driving signal sending portion 323 to start the sending of a 3D signal that controls opening and closing of the shutters.

If the sink device (the television receiver 300) receives the InfoFrame that transmits 3D information when switching from 2D video to Side-by-Side video, it is preferable to quickly change the display of the screen to a black screen (or video of a predetermined color/gray scale). Generally, after receiving video input from HDMI, the television receiver takes a time corresponding to several frames to process the video, and then displays the video on the display panel. Therefore, several frames of data remain in the television receiver. Accordingly, if the switching from 2D video to Side-by-Side video is included in the several frames of data that remain in the television receiver as a result of changing the display of the screen to the black screen immediately after receiving the InfoFrame that transmits 3D information, it is possible to avoid display of a damaged image by displaying the black screen before and after the switching.

Examples of a method for displaying a black screen on the display panel 318 of the television receiver 300 includes: a method in which, when the HDMI receiving portion 302 detects the InfoFrame that transmits 3D information of Side-by-Side (Half), the HDMI receiving portion 302 sends an event to the panel driving circuit so as to switch the output to the display panel 318 to black screen data; and a method in which, if the television receiver 300 uses an LED backlight system, when the HDMI receiving portion 302 detects the InfoFrame that transmits 3D information of Side-by-Side (Half), it sends an event to the backlight driving circuit 317 to turn off the backlight.

When a repeater device, such as the AV amplifier 200, is interposed between the source device (the video player 100) and the sink device (the television receiver 300), the repeater device detects that the source device has started sending the InfoFrame that transmits 3D information, and data of the received the InfoFrame that transmits 3D information is copied from a register of the HDMI receiving portion 203 to the register of the HDMI transmitting portion 206 inside the repeater device. Then, the HDMI transmitting portion 206 starts sending the InfoFrame that transmits 3D information.

In some cases, data copy processing inside the repeater device may require a time corresponding to one frame or more, and the transfer of the InfoFrame that transmits 3D information may be delayed with respect to the video transfer. The sink device receives the HDMI signal transferred by the repeater device, and it is necessary to take account of an influence of the delay in the repeater device. If the transfer of the InfoFrame that transmits 3D information indicating that the video is Side-by-Side (Half) is delayed with respect to the transfer of the video signal, there can be a time period in which, although the video has been switched to Side-by-Side (Half), the display mode of the television receiver 300 still indicates 2D video. Accordingly, in the television receiver 300, in order to wait for the video processing mode to switch from 2D video to Side-by-Side video, it is preferable to insert a wait of a predetermined time period.

When the predetermined time period has elapsed from the start of the wait, the source device (the video player 100) that outputs the video source cancels AVMUTE in the GCP and transmits the GCP from the HDMI transmitting portion 111 (step S115). Specifically, Clear_AVMUTE is set to 1 and Set_AVMUTE is set to 0, in the General Control Subpacket of the GCP shown in FIG. 10. In a section indicated by "unmute" of the GCP in FIG. 13, this packet has been output from the source device.

When AVMUTE is cancelled in the GCP at step S115 described above, the video output from the source device (the video player 100) switches from the black screen to Side-by-Side video (step S116).

In this manner, the content of the packet that is output via HDMI from the source device (the video player 100) is controlled when switching from 2D video to Side-by-Side video. Thus, it is possible to quickly perform video switching in the sink device (the television receiver 300), as compared to a case in which the HDCP authentication is performed. Further, by interposing a black screen period between 2D video and Side-by-Side video, it is possible to perform the video switching from 2D video to Side-by-Side video more safely than in the sequence shown in FIG. 11.

[1-6-2. Switching from Side-by-Side Video to 2D Video]

Figure 16:
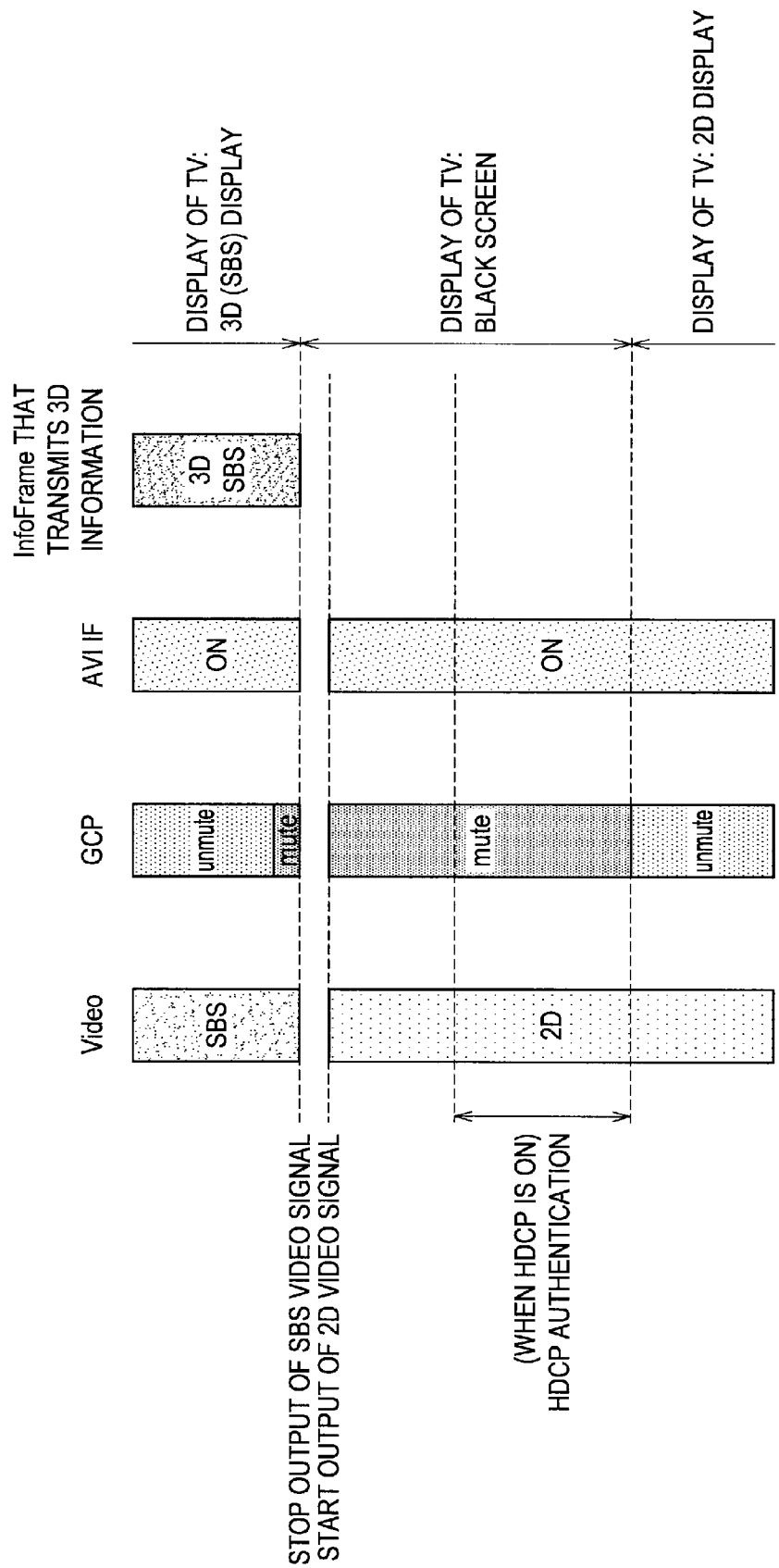
FIG. 16 is an explanatory diagram showing a data flow when switching from Side-by-Side video to 2D video is performed.

Next, a transmission sequence of video data that is transmitted in the video display system when switching from Side-by-Side video to 2D video will be described. First, known video data transmission will be described. FIG. 16 is an explanatory diagram showing a known transmission sequence of the video data when switching from Side-by-Side video to 2D video is performed.

In known art, as shown in FIG. 16, when switching from Side-by-Side video to 2D video is performed, the output of a video signal of 2D video is started after the output of a video signal of Side-by-Side video is temporarily stopped. When HDCP is enabled and transmission is performed, a format change is performed after the HDCP authentication is performed between the source device and the sink device.

A switching sequence from Side-by-Side video to 2D video shown in FIG. 16 will be described. In order to switch from Side-by-Side video to 2D video, first, the source device that outputs the video source sets AVMUTE in the GCP. Specifically, the source device sets Set_AVMUTE to 1 and sets Clear_AVMUTE to 0, in the General Control Subpacket of the GCP shown in FIG. 10. In a section indicated by "mute" of the GCP in FIG. 16, this packet has been output from the source device.

Next, outputs of the video signal (Video) of Side-by-Side video and various types of packets (the GCP, the AVI InfoFrame, and the InfoFrame that transmits 3D information) are stopped, and after a predetermined time period has elapsed, outputs of the video signal of 2D video and various types of packets (the GCP and the AVI InfoFrame) are started. Here, if HDCP is enabled and the outputs are performed, the HDCP authentication is performed. When the HDCP authentication is completed, the source device that outputs the video source cancels AVMUTE in the GCP. Specifically, the source device sets Clear_AVMUTE to 1 and sets Set_AVMUTE to 0 in the General Control Subpacket of the GCP shown in FIG. 10. In a section indicated by "unmute" of the GCP in FIG. 16, this packet has been output from the source device.

Since switching from Side-by-Side video to 2D video is performed in this manner, the switching is performed stably and safely. However, when HDCP is enabled, the black screen appears for about two seconds. Therefore, there is a problem that it takes a long time to switch from Side-by-Side 3D video to 2D video.

To address this, the present embodiment aims to reduce the switching time from Side-by-Side 3D video to 2D video, by performing switching from Side-by-Side 3D video to 2D video without stopping the output of the video signal from the source device and without performing the HDCP authentication.

Figure 17:
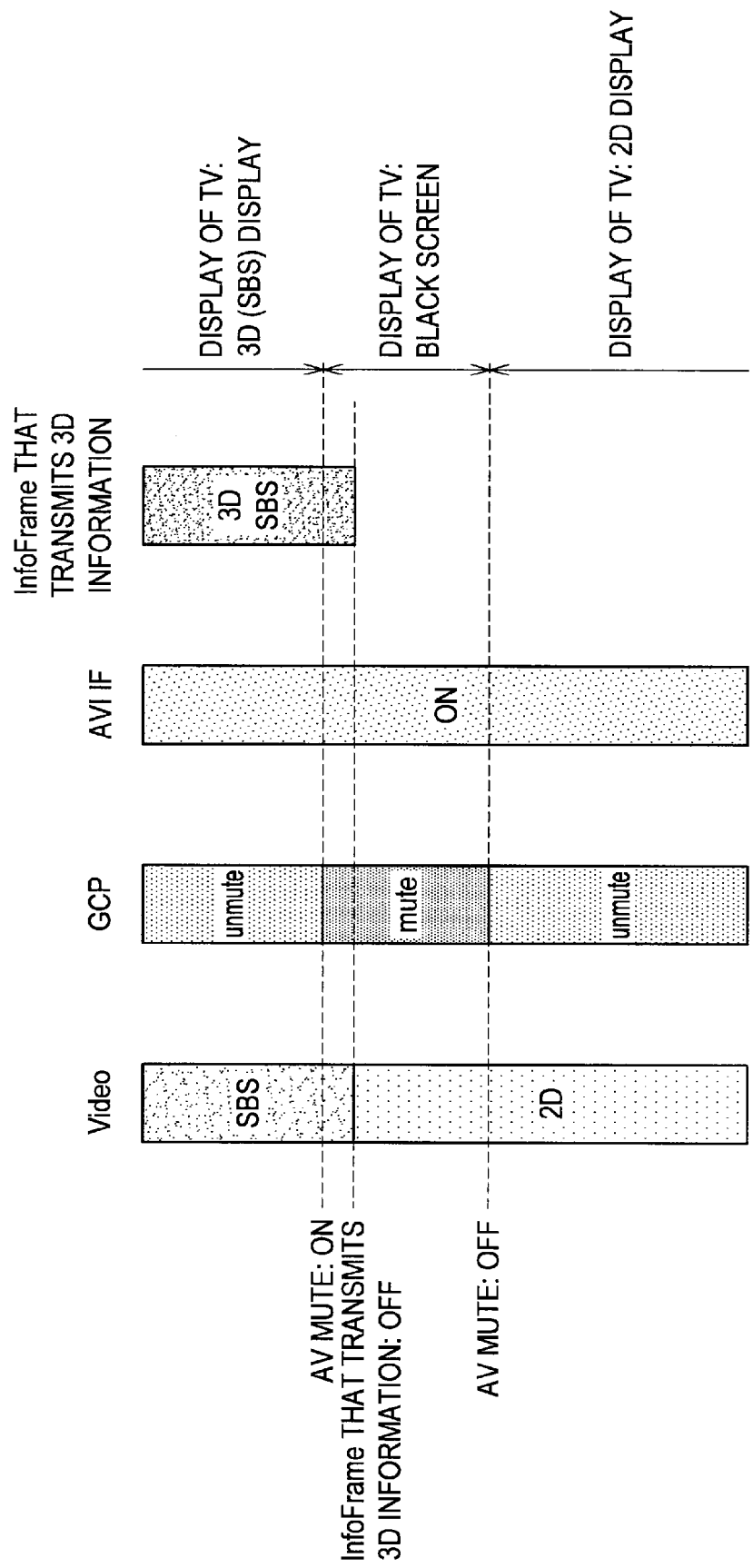
FIG. 17 is an explanatory diagram showing a data flow when switching from Side-by-Side video to 2D video is performed.

FIG. 17 is an explanatory diagram showing video data transmission in the present embodiment when switching from Side-by-Side video to 2D video is performed. As shown in FIG. 17, the video data transmission in the present embodiment aims to reduce the switching time by performing switching from Side-by-Side video to 2D video without stopping the output of the video signal from the source device and without performing the HDCP authentication.

FIG. 18 is a flowchart illustrating a switching sequence from Side-by-Side video to 2D video in the present embodiment. The switching sequence from Side-by-Side video to 2D video in the present embodiment will be described using FIG. 17 and FIG. 18.

First, the source device (the video player 100) that outputs the video source sets AVMUTE in the GCP and sends the GCP from the HDMI transmitting portion 111 (step S121). Specifically, the source device (the video player 100) sets Set_AVMUTE to 1 and sets Clear_AVMUTE to 0, in the General Control Subpacket of the GCP shown in FIG. 10. In a section indicated by "mute" of the GCP in FIG. 17, this packet has been output from the source device.

When AVMUTE is set in the GCP at step S121 described above, the video output from the source device (the video player 100) switches from Side-by-Side video to 2D video (step S122). Then, the source device (the video player 100) stops output of the InfoFrame that transmits 3D information of Side-by-Side video (step S123). Note that the setting of AVMUTE in the GCP at step S121, the video switching from Side-by-Side video to 2D video at step S122, and the stopping of the output of the InfoFrame that transmits 3D information at step S123 may be performed at the same timing (in the same frame).

When the source device (the video player 100) stops the output of the InfoFrame that transmits 3D information of Side-by-Side video, in the television receiver 300 that displays the video transmitted from the video player 100, in order to wait for the video processing mode to switch from Side-by-Side video to 2D video, a wait of a predetermined time period is inserted (step S124). This time period during which the wait is inserted may be made longer than when the video switches from 2D video to Side-by-Side video. If the time period during which the wait is inserted is made longer than when the video switches from 2D video to Side-by-Side video, it is possible to cause appropriate video to be displayed on the sink device (the television receiver 300), taking account of a time-out period for the sink device (the television receiver 300) to detect the stop of the output of the InfoFrame that transmits 3D information, and of a delay due to the repeater device (the AV amplifier 200) being interposed between the source device (the video player 100) and the sink device (the television receiver 300).

When the predetermined time period has elapsed from the start of the wait, the source device (the video player 100) that outputs the video source cancels AVMUTE in the GCP and transmits the GCP from the HDMI transmitting portion 111 (step S125). Specifically, the source device (the video player 100) sets Clear_AVMUTE to 1 and sets Set_AVMUTE to 0, in the General Control Subpacket of the GCP shown in FIG. 10. In a section indicated by "unmute" of the GCP in FIG. 17, this packet has been output from the source device.

In this manner, the content of the packet that is output via HDMI from the source device (the video player 100) is controlled when switching from Side-by-Side video to 2D video. Thus, it is possible to quickly perform video switching in the sink device (the television receiver 300), as compared to a case in which the HDCP authentication is performed.

However, if AVMUTE does not effectively work in the sink device (the television receiver 300), the sink device (the television receiver 300) processes Side-by-Side video as 2D video erroneously, and there is a possibility that video will be displayed in disorder at least temporarily.

Given this, in order to switch video from Side-by-Side video to 2D video more safely than in the sequence shown in FIG. 17, the video signal output from the source device (the video player 100) is switched from Side-by-Side video to a black screen in a section where AVMUTE has been set in the GCP, and when AVMUTE is cancelled in the GCP, the video signal output from the source device (the video player 100) is switched from the black screen to 2D video. This is because the source device (the video player 100) has no way to ascertain the level of accuracy at which the sink device (the television receiver 300) side responds to the timing of switching from Side-by-Side video to 2D video, and therefore it is preferable for the source device side to output the black screen between the videos at the video switching timing. By switching the video data and the packet in this manner, it is possible to perform the video switching from Side-by-Side video to 2D video more safely than in the sequence shown in FIG. 17.

FIG. 19 is an explanatory diagram showing another example of video data transmission in the present embodiment when switching from Side-by-Side video to 2D video is performed. As shown in FIG. 19, the other example of video data transmission in the present embodiment aims to reduce the switching time by performing switching from Side-by-Side video to 2D video, without stopping the output of the video signal from the source device, and without performing the HDCP authentication. Further, by interposing a black screen period when video is switched from Side-by-Side video to 2D video, it is possible to perform the video switching from Side-by-Side video to 2D video more safely than in the sequence shown in FIG. 17.

FIG. 20 is a flowchart illustrating a switching sequence from Side-by-Side video to 2D video in the present embodiment. The switching sequence from Side-by-Side video to 2D video in the present embodiment will be described using FIG. 19 and FIG. 20.

First, the source device (the video player 100) that outputs the video source sets AVMUTE in the GCP and sends the GCP from the HDMI transmitting portion 111 (step S131). Specifically, the source device (the video player 100) sets Set_AVMUTE to 1 and sets Clear_AVMUTE to 0, in the General Control Subpacket of the GCP shown in FIG. 10. In a section indicated by "mute" of the GCP in FIG. 19, this packet has been output from the source device.

When AVMUTE is set in the GCP at step S131 described above, the video output from the source device (the video player 100) switches from Side-by-Side video to a black screen (step S132). Note that the setting of AVMUTE in the GCP at step S131 may be performed at the same timing (in the same frame) as the switching from Side-by-Side video to the black screen, or the switching may be ahead of the setting of AVMUTE in the GCP.

When the video output from the source device (the video player 100) switches from Side-by-Side video to the black screen at step S132 described above, the source device (the video player 100) starts output of the InfoFrame that transmits 3D information of Side-by-Side video (step S133). Then, in the television receiver 300 that displays the video transmitted from the video player 100, in order to wait for the video processing mode to switch from 2D video to Side-by-Side video, a wait of a predetermined time period is inserted (step S134). This time period during which the wait is inserted may be made longer than when the video switches from 2D video to Side-by-Side video.

In order to detect that the source device has stopped the sending of the InfoFrame that transmits 3D information, the sink device (the television receiver 300) confirms that the packet of the InfoFrame that transmits 3D information does not arrive in several frames (10 to 20 frames, for example) consecutively. When it is determined that the source device has stopped the sending of the InfoFrame that transmits 3D information, the sink device (the television receiver 300) switches operation modes of internal portions to a mode that processes 2D video (a 2D processing mode) and to a mode that displays 2D video (a 2D display mode). Specifically, the HDMI receiving portion 302 switches the video signal processing circuit 314 and the graphics generation circuit 315 to the 2D processing mode, and switches the panel driving circuit 316 to the 2D display mode. Further, in a case of a 3D television receiver that uses the active shutter glasses system like the television receiver 300 according to the present embodiment, the HDMI receiving portion 302 causes the shutters of the active shutter glasses 840 to be in an open state by, for example, stopping the sending from the glasses driving signal sending portion 323 of the 3D signal that controls the opening and closing of the shutters.

If the sink device (the television receiver 300) receives the InfoFrame that transmits 3D information when switching from Side-by-Side video to 2D video, it is preferable to quickly change the display of the screen to a black screen. Generally, after receiving video input from HDMI, the television receiver takes a time corresponding to several frames to process the video, and then displays the video on the display panel. Therefore, several frames of data remain in the television receiver. Accordingly, if the switching from Side-by-Side video to 2D video is included in the several frames of data that remain in the television receiver as a result of changing the display of the screen to the black screen immediately after receiving the InfoFrame that transmits 3D information, it is possible to avoid display of a damaged image by displaying the black screen before and after the switching.

Similarly to the above-described switching from 2D video to Side-by-Side video, examples of a method for displaying a black screen on the display panel 318 of the television receiver 300 includes: a method in which, when the HDMI receiving portion 302 detects the InfoFrame that transmits 3D information of Side-by-Side (Half), the HDMI receiving portion 302 sends an event to the panel driving circuit so as to switch the output to the display panel 318 to black screen data; and a method in which, if the television receiver 300 uses the LED backlight system, when the HDMI receiving portion 302 detects the InfoFrame that transmits 3D information of Side-by-Side (Half), it sends an event to the backlight driving circuit 317 to turn off the backlight.

When a repeater device, such as the AV amplifier 200, is interposed between the source device (the video player 100) and the sink device (the television receiver 300), in order to detect that the source device has stopped the sending of the InfoFrame that transmits 3D information, the repeater device confirms that the packet of the InfoFrame that transmits 3D information does not arrive in several frames consecutively. After that, the repeater device (the AV amplifier 200) stops output of the packet of the InfoFrame that transmits 3D information from the HDMI transmitting portion 206. The sink device (the television receiver 300) detects that the sending of the InfoFrame that transmits 3D information has been stopped, based on the HDMI signal transferred by the repeater device (the AV amplifier 200). The sink device (the television receiver 300) also determines that the sending of the InfoFrame that transmits 3D information has been stopped, by confirming that the packet of the InfoFrame that transmits 3D information does not arrive in several frames consecutively. Accordingly, both the repeater device and the sink device check that the InfoFrame that transmits 3D information is not sent during several frames consecutively, and as a result, a time-out period is doubly necessary. For that reason, when the repeater device is interposed between the source device and the sink device, there are cases in which a determination of the switching from Side-by-Side video to 2D video is delayed as compared to the switching of the video signal. Accordingly, it is desirable that the source device side sets a time at which video is changed to MUTE (a black screen), taking account of the doubled time-out period.

When the predetermined time period has elapsed from the start of the wait, the source device (the video player 100) that outputs the video source cancels AVMUTE in the GCP and transmits the GCP from the HDMI transmitting portion 111 (step S135). Specifically, the source device (the video player 100) sets Clear_AVMUTE to 1 and sets Set_AVMUTE to 0, in the General Control Subpacket of the GCP shown in FIG. 10. In a section indicated by "unmute" of the GCP in FIG. 19, this packet has been output from the source device.

When AVMUTE is cancelled in the GCP at step S135 described above, the video output from the source device (the video player 100) switches from the black screen to 2D video (step S116).

In this manner, the content of the packet that is output via HDMI from the source device (the video player 100) is controlled when switching from Side-by-Side video to 2D video. Thus, it is possible to quickly perform video switching in the sink device (the television receiver 300), as compared to a case in which the HDCP authentication is performed. Further, by interposing a black screen period between Side-by-Side video and 2D video, it is possible to perform the video switching from Side-by-Side video to 2D video more safely than in the sequence shown in FIG. 17.

Another transmission sequence when switching from Side-by-Side video to 2D video will be described. FIG. 21 is an explanatory diagram showing another example of video data transmission in the present embodiment when switching from Side-by-Side video to 2D video is performed. As shown in FIG. 21, the other example of video data transmission in the present embodiment aims to reduce the switching time by performing switching from Side-by-Side video to 2D video without stopping the output of the video signal from the source device and without performing the HDCP authentication. Further, by interposing a black screen period when video is switched from Side-by-Side video to 2D video, similarly to the sequence shown in FIG. 19, it is possible to perform the video switching from Side-by-Side video to 2D video more safely than in the sequence shown in FIG. 17.

Unlike the sequence shown in FIG. 19, in the sequence shown in FIG. 21, the value of the InfoFrame that transmits 3D information is changed from Side-by-Side to 2D at the timing of switching from Side-by-Side video to 2D video, and the InfoFrame is transmitted from the source device to the sink device. When Side-by-Side video is output, "3D" is set as the video format type and "Side-by-Side (Half)" is set as the 3D system type, respectively, in the data of the packet of the "InfoFrame that transmits 3D information" shown in FIG. 15. On the other hand, when 2D video is output, "No Information (2D)" is set as the video format type and 0 is set as the value of the 3D system type (since the transmitted video is not 3D, the corresponding field is set as reserved). Further, checksum data (which corresponds to "Checksum" shown in FIG. 15) is also present in the packet of the InfoFrame that transmits 3D information.

Accordingly, a change of the InfoFrame that transmits 3D information can be detected by confirming the checksum data. When the InfoFrame that transmits 3D information changes, the HDMI receiving portions 203 and 302 of the sink device (the television receiver 300) and the repeater device (AV amplifier 200), respectively, can immediately detect the change of the InfoFrame that transmits 3D information. This is because time out processing, such as in the case where sending of the packet is stopped as shown in FIG. 19 and FIG. 20, becomes unnecessary.

Thus, in the sequence shown in FIG. 21, both the sink device (the television receiver 300) and the repeater device (AV amplifier 200) can detect the video switching from Side-by-Side video to 2D video, accurately and in a short time (about 0 to 1 frame for each device), as compared to the sequence shown in FIG. 19. As a result, although when switching from Side-by-Side video to 2D video in the source device (the video player 100), mute is provided before and after the switching, it is possible to reduce this mute time as compared to the sequence shown in FIG. 19. Further, the time period for the sink device (the television receiver 300) and the repeater device (AV amplifier 200) to detect the video switching is reduced. Therefore, cases increase in which it is possible to completely avoid a damaged image from being displayed after the mute period ends.

Note that, the InfoFrame that transmits 3D information is essentially a packet that need not be sent in a 2D video section. Therefore, after an elapse of a predetermined time period from when the video switches from Side-by-Side video to 2D video, the source device may stop the sending of the InfoFrame that transmits 3D information. Further, when the repeater device detects that the sending of the InfoFrame that transmits 3D information indicating 3D/Side-by-Side has been stopped, as in the sequences shown in FIG. 17 and FIG. 19, instead of stopping the sending of the InfoFrame that transmits 3D information as an output from the repeater device, if the "InfoFrame that transmits 3D information" indicating that video is 2D is output, as in the sequence shown in FIG. 21, or if an AVMUTE period is set before and after the start of the sending of the "InfoFrame that transmits 3D information" indicating that video is 2D and Video being output is changed to a black screen (or an image of a single color on the whole screen, an image that can be seen without a sense of discomfort regardless of whether display is performed as 2D or Side-by-Side), it is also possible to reduce a delay time until the sink device detects the switching from Side-by-Side video to 2D video.

2. Conclusion

As described above, according to the embodiment of the present embodiment, when switching from 2D video to 3D video or when switching from 3D video to 2D video, the HDCP authentication is not performed, and the output of video is stopped before and after the switching or video of a black screen (or a predetermined color/gray scale) is displayed. Thus, it is possible to reduce time required for the switching. In the sink device (the television receiver 300), it is possible to avoid a damaged image from being displayed on the screen as a result of processing Side-by-Side video as 2D video or processing 2D video as Side-by-Side video.

When switching from 3D video to 2D video, instead of stopping the sending of the InfoFrame that transmits 3D information from the source device (the video player 100), by changing the content of the packet of the InfoFrame that transmits 3D information, which is transmitted from the source device, it is possible to reduce the mute period before and after the video switching, and it is therefore possible to further reduce the time required for the video switching.

Note that the above-described series of processing may be performed by hardware or may be performed by software. When performed by software, a storage medium storing a program, for example, may be incorporated in each of the video player 100, the AV amplifier 200 and the television receiver 300. Then, such programs may be read out and executed sequentially by a CPU (Central Processing Unit), a DSP (Digital Signal Processor) or another control device incorporated in each of the video player 100, the AV amplifier 200 and the television receiver 300.

Further, in the above description, it is described that the source device that outputs video is the video player. However, the present invention is not limited to this example. For example, the source device may be a stationary game machine, a set top box that receives a broadcast wave, a personal computer or another information processing device, or it may be an HDMI output portion in the repeater device. In other words, any device can be used as the source device and the present invention can be applied thereto as long as it can transmit video data to another device.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Video display system
100 Video player
101 HDMI terminal
102 BD/DVD drive
103 Drive I/F
104 Decoding portion
105 Demultiplexer
106 Video decoder
107 Video signal processing circuit
108 3D video generation portion
109 Audio decoder
110 Audio signal processing circuit
111 HDMI transmitting portion
121 CPU
122 Flash ROM
123 DRAM
124 Remote controller receiving portion
200 AV amplifier
201, 202 HDMI terminal
203 HDMI receiving portion
204 Video signal processing circuit
205 Graphics generation circuit
206 HDMI transmitting portion
207 Audio decoder
208 Audio signal processing circuit
209 Audio amplifier circuit
210 Speaker
221 CPU
222 Flash ROM
223 DRAM
224 Remote controller receiving portion
300 Television receiver
301 HDMI terminal
302 HDMI receiving portion
303 Antenna input terminal
311 Digital tuner
312 Demultiplexer
313 Video decoder
314 Video signal processing circuit
315 Graphics generation circuit
316 Panel driving circuit
317 Backlight driving circuit
318 Display panel
319 Audio decoder
320 Audio signal processing circuit
321 Audio amplifier circuit
322 Speaker
323 Glasses driving signal sending portion
331 CPU
332 Flash ROM
333 DRAM
334 Remote controller receiving portion
501, 502, 503 HDMI cable
810, 820, 830 Remote controller transmitter
840 Active shutter glasses

The invention claimed is:

1. A video transmission device comprising:
a transmission signal output portion that outputs a video signal that causes one of two-dimensional video and three-dimensional video to be displayed, an audio signal that causes audio to be output, and a control signal including information relating to the video signal and the audio signal; and
a control portion that controls content of the control signal output from the transmission signal output portion,
wherein, when the video signal switches from three-dimensional video to two-dimensional video, the control portion does not stop output of the video signal from the transmission signal output portion, and controls the transmission signal output portion such that information indicating that the video signal output from the transmission signal output portion has switched to two-dimensional video is included in information indicating that the video signal is three-dimensional video that is output from the transmission signal output portion.

2. The video transmission device according to claim 1, wherein the control portion controls the transmission signal output portion such that a mute signal is included in the control signal, the mute signal causing output of video to be stopped in a device that receives transmission of the video signal, for a predetermined time period from immediately before the video signal switches from three-dimensional video to two dimensional video or from a same timing as the switching.

3. The video transmission device according to claim 1, wherein, when the video signal switches from three-dimensional video to two-dimensional video, the control portion controls the transmission signal output portion such that a video signal that causes video of a predetermined color and gray scale to be displayed is output.

4. The video transmission device according to claim 1, wherein the control portion controls the transmission signal output portion such that output of information explicitly indicating that the video signal is two-dimensional video is stopped, after an elapse of a predetermined time period from when the video signal switches from three-dimensional video to two-dimensional video.

5. A video transmission device comprising:
a transmission signal output portion that outputs a video signal that causes one of two-dimensional video and three-dimensional video to be displayed, an audio signal that causes audio to be output, and a control signal including information relating to the video signal and the audio signal; and
a control portion that controls content of the control signal output from the transmission signal output portion,
wherein, when the video signal switches between two-dimensional video and three-dimensional video, the control portion does not stop output of the video signal from the transmission signal output portion, and controls the transmission signal output portion such that output of information indicating that the video signal output from the transmission signal output portion is three-dimensional video is one of started and stopped.

6. The video transmission device according to claim 5,
wherein, when the video signal switches between two-dimensional video and three-dimensional video, the control portion controls the transmission signal output portion such that a mute signal is included in the control signal, the mute signal causing output of video to be stopped in a device that receives transmission of the video signal, for a predetermined time period from immediately before the switching or from a same timing as the switching.

7. The video transmission device according to claim 6,
wherein, when the video signal switches from three-dimensional video to two-dimensional video, the control portion controls the transmission signal output portion such that the time period of the mute signal is longer than when the video signal switches from two-dimensional video to three-dimensional video.

8. The video transmission device according to claim 5,
wherein, when the video signal switches between two-dimensional video and three-dimensional video, the control portion controls the transmission signal output portion such that a video signal that causes video of a predetermined color and gray scale to be displayed is output.

9. The video transmission device according to claim 5,
wherein, when the video signal switches from three-dimensional video to two-dimensional video, the control portion does not stop output of the video signal from the transmission signal output portion, and controls the transmission signal output portion such that information indicating that the video signal output from the transmission signal output portion has switched to two-dimensional video is included in information indicating that the video signal is three-dimensional video that is output from the transmission signal output portion.

10. A video display device comprising:
a transmission signal input portion that receives a video signal that causes one of two-dimensional video and three-dimensional video to be displayed, an audio signal that causes audio to be output, and a control signal including information relating to the video signal and the audio signal;
a video display portion that displays video based on the video signal; and
a video display control portion that controls an operation of the video display portion,
wherein, when the transmission signal input portion detects that the video signal has switched from two-dimensional video to three-dimensional video or from three-dimensional video to two-dimensional video, the transmission signal input portion performs, with respect to the video display control portion, control that changes display of the video display portion to one of a black screen and an image of a predetermined color and gray scale based on the video signal received during the switching.

11. A video display system comprising:
a video transmission device that transmits video; and
a video display device that receives transmission of the video from the video transmission device and displays the video,
wherein the video transmission device includes
a transmission signal output portion that outputs a video signal that causes one of two-dimensional video and three-dimensional video to be displayed, an audio signal that causes audio to be output, and a control signal including information relating to the video signal and the audio signal, and
a control portion that controls content of the control signal output from the transmission signal output portion,
wherein, when the video signal switches from three-dimensional video to two-dimensional video, the control portion controls the transmission signal output portion such that information explicitly indicating that the video signal output from the transmission signal output portion is two-dimensional video is included in the control signal,
wherein the video display device includes
a transmission signal input portion that receives the video signal that causes one of two-dimensional video and three-dimensional video to be displayed, the audio signal that causes audio to be output, and the control signal including information relating to the video signal and the audio signal,
a video display portion that displays video based on the video signal, and
a video display control portion that controls an operation of the video display portion, and
wherein, when the transmission signal input portion detects that the video signal has switched from two-dimensional video to three-dimensional video or from three-dimensional video to two-dimensional video, the transmission signal input portion performs, with respect to the video display control portion, control that changes display of the video display portion to one of a black screen and an image of a predetermined color and gray scale based on the video signal received during the switching.

12. A video transmission method comprising:
a transmission signal outputting step of outputting a video signal, from a source device, that causes one of two-dimensional video and three-dimensional video to be displayed, an audio signal that causes audio to be output, and a control signal including information relating to the video signal and the audio signal; and
a control step of controlling content of the control signal output in the transmission signal outputting step,
wherein, when the video signal switches from three-dimensional video to two-dimensional video, the control step does not stop output of the video signal, and performs control such that information explicitly indicating that the video signal output in the transmission signal outputting step is two-dimensional video is included in the control signal.

13. A non-transitory computer readable medium embodying a computer program that causes a computer to perform:

a transmission signal outputting step of outputting a video signal that causes one of two-dimensional video and three-dimensional video to be displayed, an audio signal that causes audio to be output, and a control signal including information relating to the video signal and the audio signal; and a control step of controlling content of the control signal output in the transmission signal outputting step, wherein, when the video signal switches from three-dimensional video to two-dimensional video, the control step does not stop output of the video signal, and performs control such that information explicitly indicating that the video signal output in the transmission signal outputting step is two-dimensional video is included in the control signal.

14. The video transmission device according to claim 1, wherein switching from three-dimensional video to two-dimensional video occurs without performing authentication.

15. The video display system according to claim 11, further comprising:

a repeater device connected to both the video transmission device and the video display device, wherein the repeater device includes a video signal processing circuit that converts the video signal between various formats.

* * * * *